US006714224B2

(12) United States Patent
Yamanaka et al.

(10) Patent No.: US 6,714,224 B2
(45) Date of Patent: Mar. 30, 2004

(54) METHOD AND APPARATUS FOR IMAGE FORMING CAPABLE OF EFFECTIVELY PERFORMING COLOR IMAGE POSITION ADJUSTMENT

(75) Inventors: Tetsuo Yamanaka, Tokyo (JP); Kazuhiko Kobayashi, Tokyo (JP); Tadashi Shinohara, Kanagawa-ken (JP); Jun Hosokawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 10/041,648

(22) Filed: Jan. 10, 2002

(65) Prior Publication Data

US 2002/0089579 A1 Jul. 11, 2002

(30) Foreign Application Priority Data

Jan. 10, 2001 (JP) .................................... P2001-002482

(51) Int. Cl.[7] ........................ G03G 21/16; G03G 15/01; B41J 2/385; G01D 15/06

(52) U.S. Cl. ........................... 347/116; 399/12; 399/13; 399/72; 399/111; 399/301

(58) Field of Search ................................ 399/110, 111, 399/126, 49, 72, 13, 15, 301, 40, 9, 10, 112, 12; 347/116

(56) References Cited

U.S. PATENT DOCUMENTS

| | | | | |
|---|---|---|---|---|
| 5,486,909 A | | 1/1996 | Takenaka et al. | |
| 5,489,747 A | | 2/1996 | Takenaka et al. | |
| 5,552,870 A | | 9/1996 | Murakami et al. | |
| 5,617,191 A | | 4/1997 | Murakami et al. | |
| 5,621,221 A | | 4/1997 | Shinohara et al. | |
| 5,625,438 A | | 4/1997 | Sugiyama et al. | |
| 5,625,440 A | | 4/1997 | Matsumae et al. | |
| 5,625,441 A | | 4/1997 | Sugiyama et al. | |
| 5,666,625 A | | 9/1997 | Komatsubara et al. | |
| 5,689,782 A | | 11/1997 | Murakami et al. | |
| 5,697,026 A | | 12/1997 | Matsumae et al. | |
| 5,708,942 A | | 1/1998 | Sugiyama et al. | |
| 5,717,981 A | | 2/1998 | Yamanaka | |
| 5,737,665 A | | 4/1998 | Sugiyama et al. | |
| 5,765,083 A | | 6/1998 | Shinohara | |
| 5,768,665 A | | 6/1998 | Yamanaka et al. | |
| 5,826,144 A | | 10/1998 | Takenaka et al. | |
| 5,828,937 A | * | 10/1998 | Aerens et al. | 399/301 |
| 5,845,183 A | | 12/1998 | Sugiyama et al. | |
| 5,875,380 A | | 2/1999 | Iwata et al. | |
| 5,879,752 A | | 3/1999 | Murakami et al. | |
| 5,897,243 A | | 4/1999 | Komatsubara et al. | |
| 5,899,597 A | | 5/1999 | Shinohara et al. | |

(List continued on next page.)

FOREIGN PATENT DOCUMENTS

| | | | |
|---|---|---|---|
| JP | 1-167769 | * | 7/1989 |
| JP | 11-65208 | | 3/1999 |
| JP | 11-102098 | | 4/1999 |
| JP | 11-249380 | | 9/1999 |
| JP | 2000-112205 | | 4/2000 |

*Primary Examiner*—Susan S. Y. Lee
(74) *Attorney, Agent, or Firm*—Oblon, Spivak, McClelland, Maier & Neustadt, P.C.

(57) ABSTRACT

A method of image forming that employs detachable image forming mechanisms for forming color images, each individually using a color toner different from each other and an image carrying member for carrying the color images that are sequentially overlaid on one another into a single color image. A detecting step detects the exchange of one of the detachable image forming mechanisms. A further step performs an adjustment for eliminating displacements of color images formed by the detachable image forming mechanisms, in accordance with the detection of the exchange of one of the detachable image forming mechanisms detected in the detecting step.

19 Claims, 20 Drawing Sheets

U.S. PATENT DOCUMENTS

| | | | | | |
|---|---|---|---|---|---|
| 5,930,561 | A | | 7/1999 | Hosokawa et al. | |
| 5,962,783 | A | | 10/1999 | Iwata et al. | |
| 5,963,240 | A | | 10/1999 | Shinohara et al. | |
| 6,008,826 | A | * | 12/1999 | Foote et al. | 347/116 |
| 6,033,818 | A | | 3/2000 | Sugiyama et al. | |
| 6,118,557 | A | | 9/2000 | Sugiyama et al. | |
| 6,128,459 | A | | 10/2000 | Iwata et al. | |
| 6,163,666 | A | | 12/2000 | Hosokawa et al. | |
| 6,167,217 | A | * | 12/2000 | Kelsch et al. | 399/72 |
| 6,167,221 | A | | 12/2000 | Kobayashi | |
| 6,212,343 | B1 | | 4/2001 | Hosokawa et al. | |
| 6,282,396 | B1 | | 8/2001 | Iwata et al. | |
| 6,295,435 | B1 | | 9/2001 | Shinohara et al. | |
| 6,380,960 | B1 | | 4/2002 | Shinohara | |
| 6,381,428 | B1 | * | 4/2002 | Yamamoto et al. | 399/110 |
| 6,381,435 | B2 | | 4/2002 | Shinohara et al. | |
| 6,459,868 | B1 | * | 10/2002 | Takahashi et al. | 399/110 |

* cited by examiner

METHOD AND APPARATUS FOR IMAGE FORMING CAPABLE OF EFFECTIVELY PERFORMING COLOR IMAGE POSITION ADJUSTMENT

BACKGROUND OF THE INVENTION

1. Field of the Invention

This patent specification relates to a method and apparatus for image forming, and more particularly to a method and apparatus for image forming capable of effectively performing a color image position adjustment.

2. Description of Related Art

Conventionally, color image forming apparatus that form a color image using a number of different color toners often cause a defective phenomenon that images of different color toners are displaced relative to each other. This typically causes a blurred color image. Therefore, these color image forming apparatus are required to adjust positions of color images to precisely form a single color image with an appropriate color reproduction.

Japanese Patent No. 2573855, for example, describes an exemplary color position adjustment and a test pattern used in the color position adjustment. Also, several other test patterns are described in published Japanese unexamined patent applications No. 11-65208, No. 11-102098, No. 11-249380, and No. 2000-112205. In the image forming apparatus disclosed in these documents, a plurality of photosensitive drums form a predetermined test image pattern using a plurality of color toners on both longitudinal sides of an image carrying surface of an image carrying member. The predetermined test pattern is detected by a pair of optical sensors. Based on this detection, displacements of the color images relative to each other are calculated and are used to justify the positions of the color images. More specifically, the predetermined test pattern includes a plurality of marks and the reading of the marks allows an analysis of a displacement of each color from a predetermined reference position. For example, the color position adjustment calculates a displacement dy in a sub-scanning direction y, a displacement dx in a main scanning direction x, a displacement dLx of an effective line length in a main scanning line, and a skew dSq in the main scanning line.

Particularly, the above-mentioned Japanese patent No. 2573855 describes an image forming apparatus capable of moving a reflective mirror arranged on a light path with a stepping motor to adjust a magnification, a slant in the sub-scanning direction, and a parallel movement so as to correct a registration. Also, this image forming apparatus is capable of controlling a drive of a photosensitive drum or a transfer belt to correct a registration.

However, the above-mentioned color position adjustment is not automatically performed by the image forming apparatus. The present inventors have recognized that at present there is no such image forming apparatus that can automatically perform a color position adjustment operation.

SUMMARY OF THE INVENTION

This patent specification describes a novel method of image forming. In one example, this novel method includes the steps of providing, detecting, and performing. The providing step provides a plurality of detachable image forming mechanisms for forming color images, each individually using a color toner different from each other, and an image carrying member for carrying the color images sequentially overlaid on one another into a single color image. The detecting step detects an individual exchange of the plurality of detachable image forming mechanisms. The performing step performs an adjustment for eliminating displacements of color images formed by the plurality of detachable image forming mechanisms, in accordance with a detection of the individual exchange of the plurality of detachable image forming mechanisms detected in the detecting step.

In the above-mentioned method, each of the plurality of detachable image forming mechanisms may include a photosensitive member and a developing mechanism containing a different developing agent.

The above-mentioned method may further include the step of executing a process control for controlling image forming parameters prior to the performing step.

This patent specification further describes a novel image forming apparatus. In one example this novel image forming apparatus includes an optical writing mechanism, a plurality of detachable image forming mechanisms, an image carrying member, an exchange detecting mechanism, a test pattern reading mechanism, and a controlling mechanism. The optical writing mechanism is arranged and configured to generate a writing beam modulated according to image data. Each of the plurality of detachable image forming mechanisms includes a photosensitive member and is arranged and configured to form a color image with a different color toner in accordance with the writing beam. The image carrying member carries color images formed by the plurality of detachable image forming mechanisms and that are sequentially overlaid on one another into a single color image. The exchange detecting mechanism is arranged and configured to detect an individual exchange of the plurality of detachable image forming mechanisms. The test pattern reading mechanism is arranged and configured to read a predetermined test pattern formed by the plurality of detachable image forming mechanisms on the image carrying member. The controlling mechanism is arranged and configured to instruct the plurality of detachable image forming mechanisms to form the predetermined test pattern on the image carrying member when the exchange detecting mechanism detects an individual exchange of the plurality of detachable image forming mechanisms. The controlling mechanism is further arranged and configured to perform a color image position adjustment based on readings of the predetermined test pattern by the test pattern reading mechanism.

The exchange detecting mechanism may include a detecting member for the apparatus and an actuator for each of the plurality of detachable image forming mechanisms. The detecting member may detect the actuator that is moved to a position detectable by the detecting member after a corresponding one of the plurality of detachable image forming mechanisms is driven.

Each of the plurality of detachable image forming mechanisms may use one of a magenta, cyan, yellow, and black color toners different from each other.

The predetermined test pattern may include patterns of the magenta, cyan, yellow, and black color toners to be sequentially formed with a slight distance between two immediately adjacent patterns.

The color image position adjustment may adjust the optical writing mechanism to justify positions of the color images formed on the image carrying member via the plurality of detachable image forming mechanisms.

This patent specification further describes a novel method of image forming. In one example, this novel method includes the steps of arranging, providing, detecting, instructing, reading, and performing. The arranging step arranges an optical writing mechanism to generate a writing beam in accordance with image data. The providing step provides a plurality of detachable image forming mechanisms detachably installed to an apparatus. The plurality of image forming mechanisms are capable of forming color images according to the writing beam with different color toners in a manner overlaying on one after another to form a single color image on an image carrying member. The detecting step detects with a uniquely arranged detecting mechanism an event that at least one of the plurality of detachable image forming mechanisms is exchanged. The instructing step instructs the plurality of detachable image forming mechanisms to form a predetermined test pattern on the image carrying member when the detecting step detects the event that at least one of the plurality of detachable image forming mechanisms is exchanged. The reading step reads the predetermined test pattern formed by the plurality of detachable image forming mechanisms on the image carrying member. The performing step performs a color image position adjustment based on the readings of the predetermined test pattern in the reading step.

The uniquely arranged detecting mechanism used in the detecting step may include a detecting member disposed to the apparatus and an actuator disposed to each of the plurality of detachable image forming mechanisms. The detecting member detects the actuator that is moved to a position detectable by the detecting member after a corresponding one of the plurality of detachable image forming mechanisms is driven.

Each of the plurality of detachable image forming mechanisms may use one of a magenta, cyan, yellow, and black color toners different from each other.

The predetermined test pattern may include patterns of the magenta, cyan, yellow, and black color toners to be sequentially formed with a slight distance between two immediately adjacent patterns.

The color image position adjustment may adjust the optical writing mechanism to justify positions of the color images formed on the image carrying member via the plurality of detachable image forming mechanisms.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
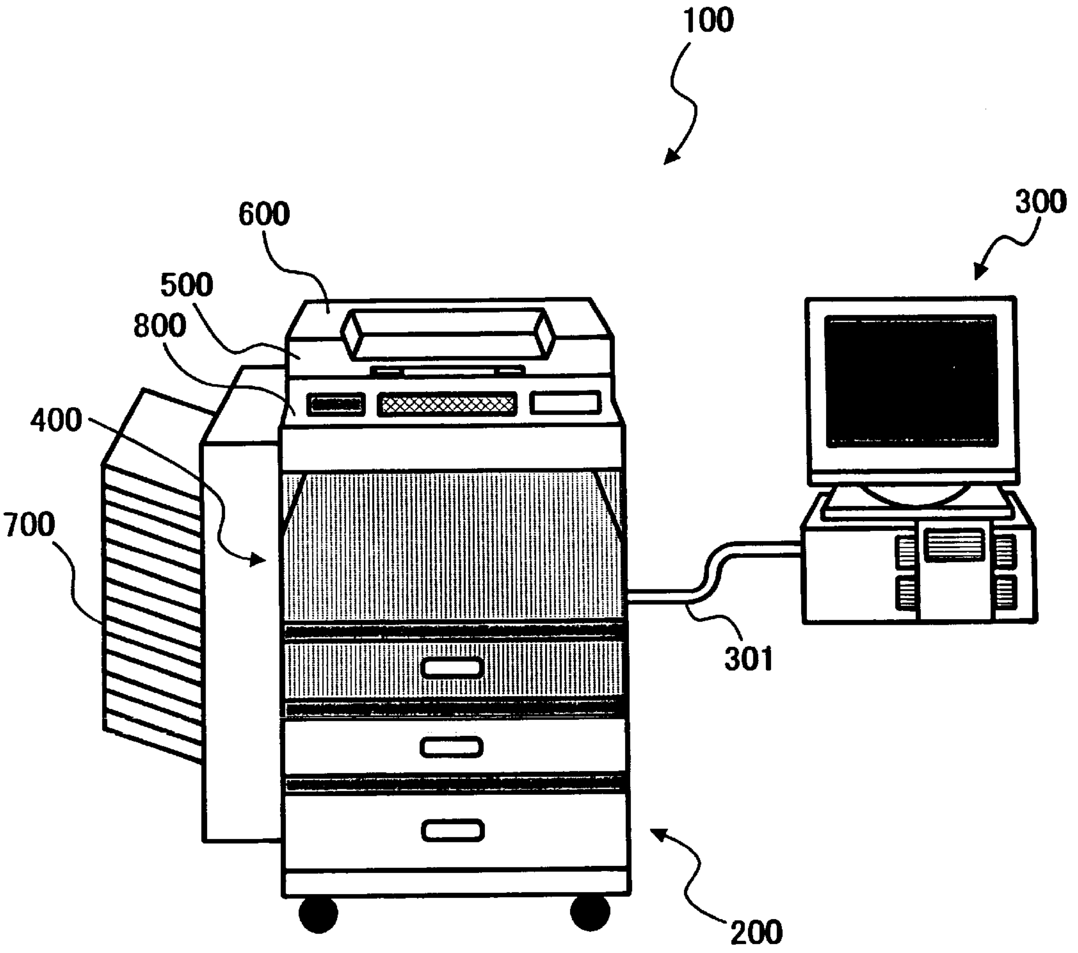
FIG. 1 is a schematic view of a color image forming system according to a preferred embodiment of the present invention.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, and more particularly to FIG. 1 thereof, an exemplary internal structure of a color image forming system 100 according to a preferred embodiment of this patent specification is illustrated. The color image forming system 100 of FIG. 1 includes a color multi-function apparatus 200 and a personal computer 300 that is externally connected to the color multi-function apparatus 200 with a signal cable 301. The color multi-function apparatus 200 includes a color printer 400, an image scanner 500, an automatic sheet feeder (ADF) 600, an automatic sorter 700, and a control panel 800. The color multi-function apparatus 200 is capable of reproducing an image based on an original image read with the image scanner 500, as well as print data input through a communications interface (not shown) from an external host computer such as the personal computer 300.

Figure 2:
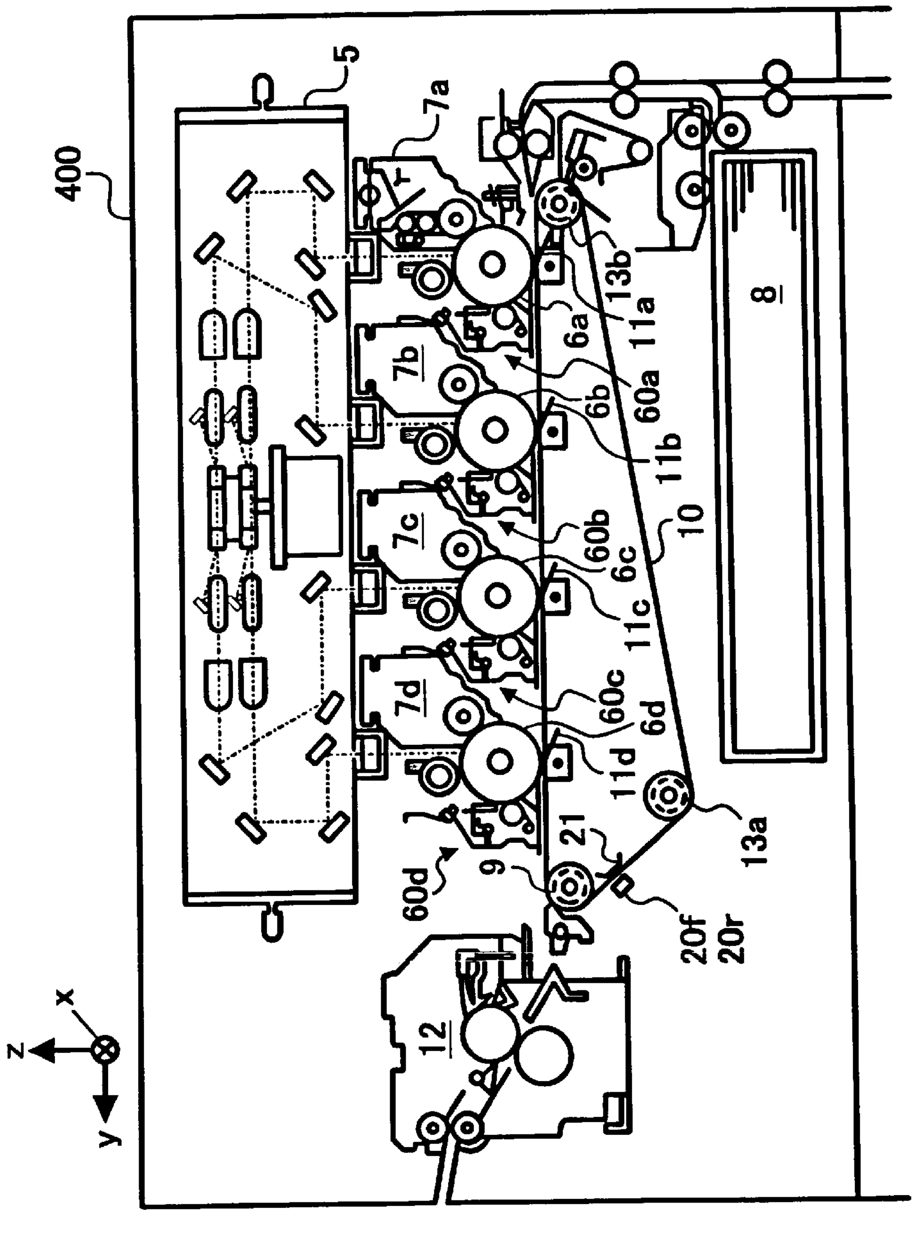
FIG. 2 is a cross-sectional view of a color printer included in the color image forming system of FIG. 1.

Referring to FIG. 2, an image forming mechanism of the color printer 400 is explained. As illustrated in FIG. 2, the color printer 400 is provided with an optical writing unit 5 to which color recording image signals representing black (Bk), yellow (Y), cyan (C), and magenta (M) color data are input. These color image signals are produced by an image processor 40 (FIG. 3), explained later, based on image data generated by the image scanner 500. Using the above-mentioned input color image signals, the optical writing unit 5 in turn generates laser beams for the M, C, Y, and Bk color data and modulates the laser beams in accordance with the M, C, Y, and Bk color data.

The color printer 400 is further provided, under the optical writing unit 5, with latent image carrying units 60*a*, 60*b*, 60*c*, and 60*d* in this order from right to left in FIG. 2. The latent image carrying unit 60*a* includes a photosensitive drum 6*a* and associated components (explained later with reference to FIG. 4) arranged around the photosensitive drum 6*a*. Likewise, the latent image carrying units 60*b*, 60*c*, and 60*d* include the photosensitive drums 6*b*, 6*c*, and 6*d*, respectively, and associated components. The color printer 400 is further provided, under the optical writing unit 5, with developing units 7*a*, 7*b*, 7*c*, and 7*d* also in this order from right to left in FIG. 2 so that the developing units 7*a*, 7*b*, 7*c*, and 7*d* face the photosensitive drums 6*a*, 6*b*, 6*c*, and 6*d*, respectively. The combination of the latent image carrying unit 60*a* and the developing unit 7*a* corresponds to the M color. Likewise, the combinations of the photosensitive drum 6*b* and the developing unit 7*b*, the photosensitive drum 6*c* and the developing unit 7*c*, and the photosensitive drum 6*d* and the developing unit 7*d* correspond to the remaining C, Y, and Bk colors, respectively. The photosensitive drums 6*a*, 6*b*, 6*c*, and 6*d* are driven for rotation in a clockwise direction in FIG. 2 by a driving source (not shown). The optical writing unit 5 sequentially scans the surfaces of the rotating photosensitive drums 6*a*, 6*b*, 6*c*, and 6*d* with the laser beams modulated in accordance with the respective color data so that electrostatic latent images for the M, C, Y, and Bk colors are formed on the photosensitive drums 6*a*, 6*b*, 6*c*, and 6*d*, respectively. The electrostatic latent images of the M, C, Y, and Bk colors formed on the photosensitive drums 6*a*, 6*b*, 6*c*, and 6*d* are developed into M, C, Y, and Bk toner images with M, C, Y, and Bk color toner by the respective developing units 7*a*, 7*b*, 7*c*, and 7*d*.

Each of the above-mentioned latent image carrying units 60*a*–60*d* and each of the developing units 7*a*–7*d* are detachably installed in the color printer 400.

As illustrated in FIG. 2, the color printer 400 is further provided with a sheet cassette 8, a driving roller 9, a transfer belt 10, transfer units 11*a*, 11*b*, 11*c*, and 11*d*, a fixing unit 12, a tension roller 13*a*, an idle roller 13*b*, reflective optical sensors 20*f* and 20*r*, and a reflection plate 21.

In synchronism with the time the M, C, Y, and Bk color toner images are formed, a recording sheet is picked up from a plurality of recording sheets contained in the sheet cassette 8 and is transferred onto the transfer belt 10 of a transfer belt unit (not shown). The M, C, Y, and Bk color toner images on the photosensitive drums 6*a*, 6*b*, 6*c*, and 6*d* are sequentially transferred onto the recording sheet with the transfer units 11*a*, 11*b*, 11*c*, and 11*d*, respectively. Consequently, the M, C, Y, and Bk color toner images are in turn overlaid so as to form one full color toner image on the recording sheet, which process is referred to as an overlay-transfer process. The recording sheet carrying the thus-formed full color toner image is transferred to the fixing unit 12 that fixes the full color toner image with heat and pressure on the recording sheet. After the fixing process, the recording sheet having the fixed full color toner image thereon is ejected outside of the color printer 400.

The above-mentioned transfer belt 10 is a translucent endless belt supported by the driving roller 9, the tension roller 13*a*, and the idle roller 13*b*. The transfer belt 10 is extended with an approximately constant tension since the tension roller 13*a* pushes the transfer belt 10 in a downward direction.

The color printer 400 is provided with countermeasures against erroneous color displacements among the overlaid colors caused in the above-mentioned overlay-transfer process. The optical writing unit 5 is configured to write a predetermined test pattern (FIG. 6), explained later, on the surfaces of the photosensitive drums 6*a*, 6*b*, 6*c*, and 6*d*. The predetermined test pattern includes a front test pattern formed on front sides (e.g., the surface side of FIG. 2) of the photosensitive drums 6*a*, 6*b*, 6*c*, and 6*d* and a rear test pattern formed on rear sides (e.g., the rear surface side of FIG. 2) of the photosensitive drums 6*a*, 6*b*, 6*c*, and 6*d*. The test pattern is developed and transferred onto a recording sheet. The recording sheet carrying the test pattern is brought to the reflective optical sensors 20*f* and 20*r* that read the front and rear test patterns, respectively. On the basis of the readings of the front and rear test patterns, displacements of the respective color layers in positions, angles, magnifications, and so on are detected, and accordingly the optical writing unit 5 is adjusted to correctly perform the writing operations relative to the photosensitive drums 6*a*, 6*b*, 6*c*, and 6*d* without causing such displacements.

The reflection plate 21 is disposed at a position inside and in contact with the transfer belt 10 to face the reflection optical sensors 20*f* and 20*r* via the transfer belt 10 so as to reflect the light emitted from the reflection optical sensors 20*f* and 20*r* and passing through the transfer belt 10. In addition, the reflection plate 21 prevents the transfer belt 10 from generating a vertical vibration.

Figure 3:
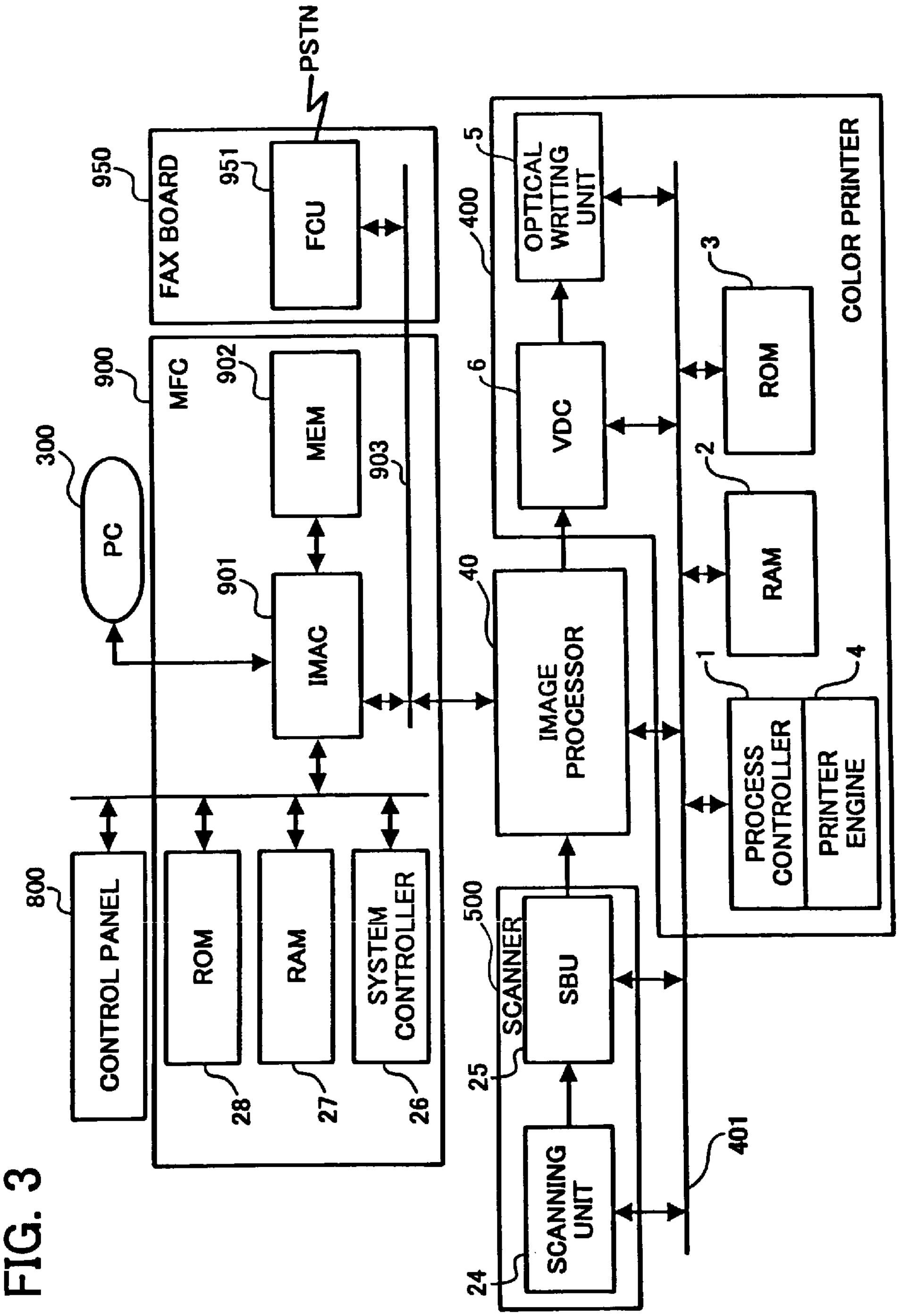
FIG. 3 is a block diagram of a controlling system of the color image forming system of FIG. 1.

Referring to FIG. 3, a control system and electrical wiring of the color multi-function apparatus 200 shown in FIG. 1 is explained. The scanner 500 includes a scanning unit 24 and a sensor board unit (SBU) 25. The scanning unit 24 scans the surface of an original placed on the scanner 500 with light and collects the light reflected from the original with mirrors and lenses. The corrected light is focused on a photoreceptor (not shown), e.g., a CCD (charge-coupled device), mounted on the sensor board unit 25. The CCD converts the light information into electrical signals, i.e., image signals. The sensor board unit 25 further converts the image signals into digital signals representing image data of the read original, and outputs the digital signals to the image processor 40.

As illustrated in FIG. 3, the color multi-function apparatus 100 further includes a multi-function controller (MFC) 900 that includes a system controller 26, a RAM (random access memory) 27, a ROM (read only memory) 28, an image memory access controller (IMAC) 901, a memory (MEM) 902, and a parallel bus 903, and a facsimile (FAX) board 950 that includes a facsimile control unit (FCU) 951.

The color printer 400 further includes a process controller 1, a RAM (random access memory) 2, a ROM (read only memory) 3, a printer engine 4, an optical writing unit 5, a video data controller (VDC) 6, and a serial bus 401.

The system controller 26 of the MFC 900 and the process controller 1 of the color printer 400 communicate with each other through the parallel bus 903, the serial bus 401, and the image processor 40. The image processor 40 internally performs a data format conversion for a data interface between the parallel bus 903 and the serial bus 401.

The digital image signals representing the image data output from the sensor board unit 25 are degraded to a certain extent because they generally lose energy when passing through the optical system and when undergoing a quantization process. In particular, a signal degradation caused through a scanner system appears to be a distortion of image data read from an original due to characteristics of a scanner. The image processor 40 compensates for such degradation of the image signals. The image processor 40 then transfers the image signals to the MFC 900 to store the image data in the MEM 902, or processes the image signals for a reproduction purpose and transfers the processed image signals to the color printer 400.

In other words, the image processor 40 performs a first job for storing the image data read from originals into the MEM 902 for a future use and a second job for outputting the image to the VDC 6 of the color printer 400, without storing the image data into the MEM 902, for an image reproduction purpose with the color printer 400. For example, the scanning unit 24 is driven one time to read the original and the read image data are stored into the MEM 902. After that, the stored image data are retrieved for a number of times required. This is an example of a first job, making a plurality of copies from one sheet of an original. To make one copy from one sheet of an original is an example of a second job. In this case, the read image data are transferred straight to the process for image reproduction, without the need for being stored in the MEM 902.

In the second job, the image processor 40 performs a reading-degradation correction relative to the image data output from the SBU 25 and, after that, executes an area-grayscale conversion for converting the corrected image data into area-grayscale image data so as to improve quality of the image. After the conversion, the image data is transferred to the VDC 6 of the color printer 400. Relative to the signals converted in the area-grayscale image data, the VDC 6 executes post-processing operations associated with dot assignments and a pulse control for reproducing dots for a print image, and outputs a video signal representing the dots for the print image. The optical writing unit 5 then forms the print image in accordance with the video signal, thereby reproducing an image in accordance with the image read from the original by the scanner 500.

In the first job, the image data are subjected to the reading-degradation correction and are then stored in the MEM 902 before the corrected image data are used. In cases that require an additional data handling operation such as an image rotation, an image synthesis, etc., the corrected image data are sent to the IMAC 901 through the parallel bus 903. The IMAC 901 performs various operations under the control of the system controller 26, for example, a control of an access to the image data stored in the MEM 902, an expansion of print data transferred from an external computer (e.g., the PC 300), that is, a conversion from character codes into character bits, compression and decompression of the image data for an effective memory use, and so forth. The image data transferred to the IMAC 901 are compressed and are stored in the MEM 902. The compressed image data thus stored in the MEM 902 are retrieved on demand. When retrieved, the compressed image data are decompressed to become the image data as they should be and are returned from the IMAC 901 to the image processor 40 via the parallel bus 903.

The image data thus retrieved from the MEM 902 are in turn subjected to the area-grayscale conversion of the image processor 40 and to the post-processing operations and the pulse control of the VDC 6, and are converted into a video signal representing dots for a print image. The optical unit 5 then forms the print image in accordance with the video signal, thereby reproducing an image in accordance with the image read from the original by the scanner 500.

The color multi-function apparatus 100 is provided with a facsimile function as one of the available multiple functions. When the facsimile function is activated, image data read from an original by the scanner 500 are subjected to the reading-degradation correction performed by the image processor 40 and are transferred to the FCU 951 of the facsimile board 950 through the parallel bus 903. The FCU 951 is connected to a PSTN (public switched telephone network). The FCU 951 converts the image data transferred from the image processor 40 into facsimile data and transmits the facsimile data to the PSTN. In receiving facsimile information sent from a facsimile terminal through the PSTN, the FCU 951 converts the received facsimile information into image data and transmits the converted image data to the image processor 40 through the parallel bus 903. In this case, the image processor 40 does not perform the reading-degradation correction on the image data of the facsimile information and transmits the image data to the VDC 6. Accordingly, in the VDC 6, the image data of the facsimile information are subjected to the post-processing operations for the dot assignments and the pulse control, and are converted into a video signal representing dots for a print image according to the received facsimile information. The optical unit 5 then forms the print image in accordance with the video signal, thereby reproducing an image in accordance with the received facsimile information.

The color multi-function apparatus 100 allows simultaneous performances of a plurality of jobs such as the copying function, the facsimile receiving function, and the printing function, for example. In such a case, the system controller 26 and the process controller 1 in collaboration with each other assign priorities to the jobs of these competing functions in using the scanning unit 24, the optical writing unit 5, and the parallel bus 903.

The process controller 1 controls the stream of the image data. The system controller 26 checks statuses of the function units and major components, and controls the entire system of the color multi-function apparatus 100. The control panel 800 allows a user to select functions and to instruct details of each function such as the copying function, the facsimile function, etc.

The printer engine 4 includes a major part of the image forming mechanism explained and illustrated in FIG. 2 and also various other mechanical and electrical components and units, such as motors, solenoids, charging units, a heater, lamps, various electrical sensors, driving circuits for driving these components and units, detecting circuits, etc., which are not illustrated in FIG. 2. The process controller 1 controls electrical operations of these components and units and obtains statuses of the components and the units based on detection signals output from the detecting circuits.

Figure 4:
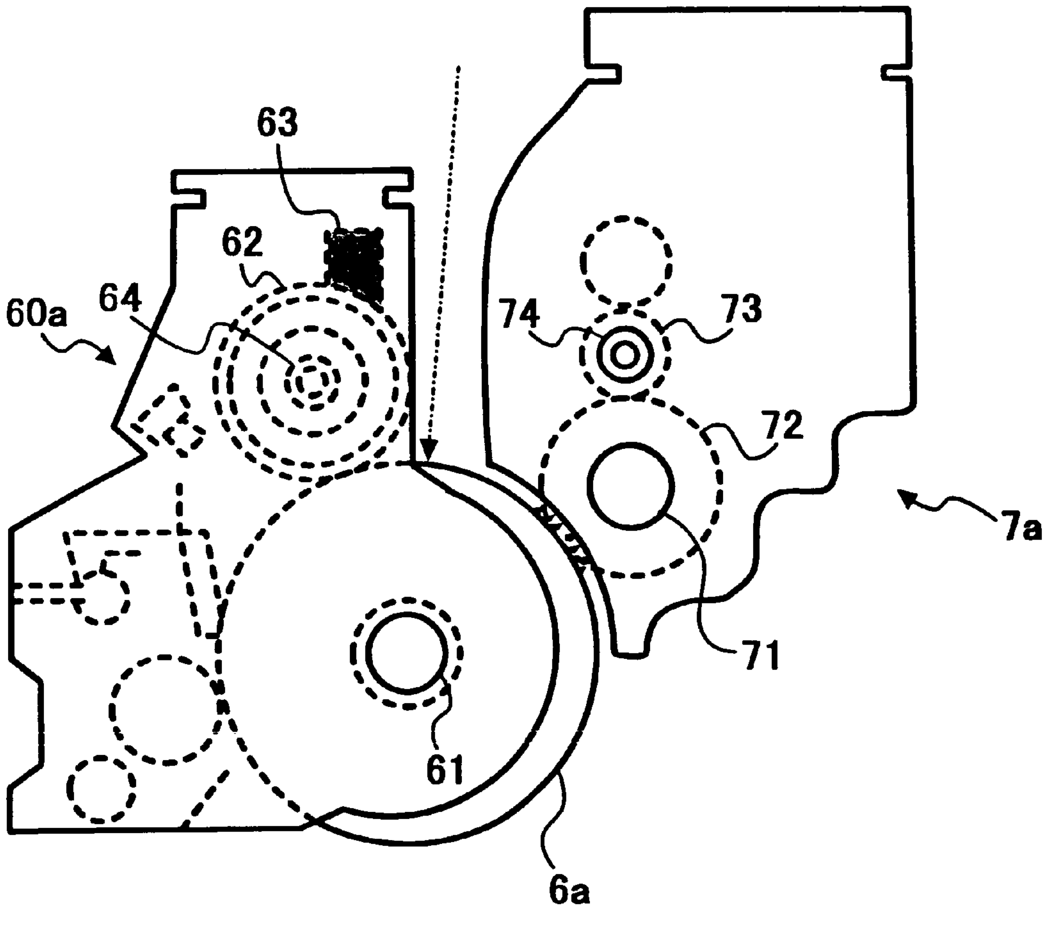
FIG. 4 is an illustration of a pair of a latent image carrying unit and a developing unit of the color printer of FIG. 2.
Figure 5A:
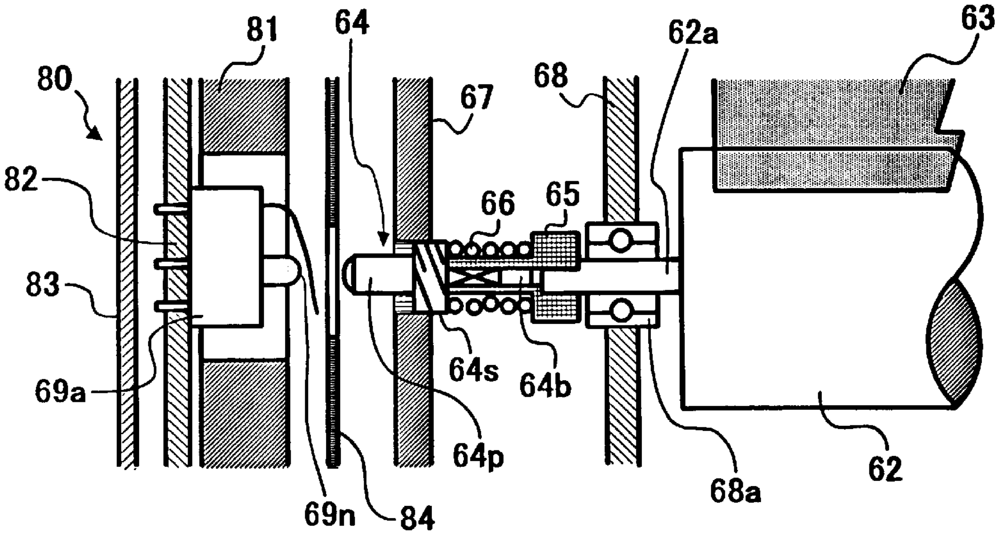
FIGS. 5A and 5B are horizontal cross-sectional views of one end of a charging roller of the latent image carrying unit of FIG. 4.
Figure 5B:
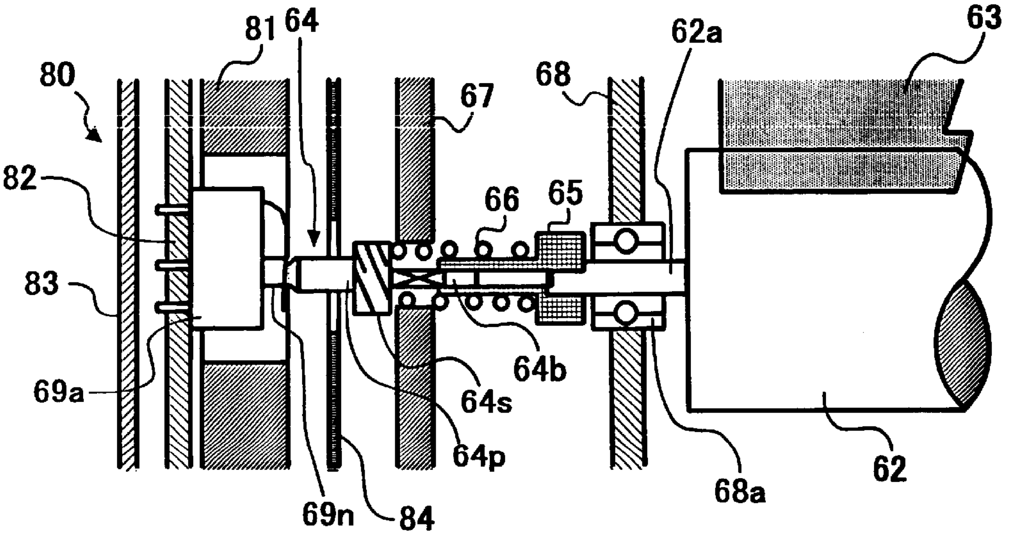

Referring to FIGS. 4, 5A, and 5B, mechanisms for positioning the photosensitive drum and detecting a new replacement of the latent image carrying unit and the developing unit are explained. FIG. 4 illustrates the latent image carrying unit 60*a* and the developing unit 7*a* seen from the front surface side of FIG. 4. Although a discussion here focuses on the combination of the latent image carrying unit 60*a* and the developing unit 7*a*, a similar discussion can also be applied to the combinations of the latent image carrying units 60*b*, 60*c*, and 60*d* and the respective developing units 7*b*, 7*c*, and 7*d*.

As illustrated in FIG. 4, the latent image carrying unit 60*a* further includes a charging roller 62, a cleaning pad 63, a screw pin 64. The photosensitive drum 6*a* of the latent image carrying unit 60*a* is provided with a rotating shaft 61 such that a front end of the rotating shaft 61 protrudes from a front cover 67 (FIG. 5A) of the latent image carrying unit 60*a*. The front end of shaft 61 is formed in a pointed "corn" shape to be easily engaged into a registration hole (not shown) made in a surface plate 81 (FIG. 5A) of a surface plate unit

80 (5A). Accordingly, the position of the photosensitive drum 6*a* can be easily determined.

In addition, the developing unit 7*a* includes a developing roller 72 that includes a developing roller shaft 71. The developing roller 72 with the developing roller shaft 71 is arranged in a manner similar to that in which the photosensitive drum 6*a* and the rotating shaft 61 are arranged.

The surface plate 81 shown in FIG. 5A is provided with registration holes, including the above-mentioned registration hole for the photosensitive drum 6*a*, for positioning the rotating shafts 61 of the photosensitive drums 6*a*–6*d* and the developing roller shafts 71 of the developing rollers 72 of the developing units 7*a*–7*d*. Therefore, by fixing the surface plate 81 to a basic frame (not shown) of the color printer 400, the rotating shafts 61 of the photosensitive drums 6*a*–6*d* and the developing roller shafts 71 of the developing rollers 72 of the developing units 7*a*–7*d* can be precisely positioned. The surface plate 81 is further provided with a plurality of holes having relatively large diameters, in which micro switches 69*a*–69*d* and also micro switches 79*a*–79*d* (FIG. 7) are engaged. The micro switches 69*a*–69*d* are usually closed to detect the existence of the latent image carrying units 60*a*–60*d*, respectively, and the micro switches 79*a*–79*d* (FIG. 7) are usually closed to detect the existence of the developing units 7*a*–7*d*, respectively. These micro switches 69*a*–69*d* and 79*a*–79*d* are mounted to a printed circuit board 82. The surface plate 81 has an inner surface covered with an inner cover 84 and the printed circuit board 82 has an outer surface covered with an outer cover 83.

As illustrated in FIG. 4, the screw pin 64 of the latent image carrying unit 60*a* protrudes from the front surface of the latent image carrying unit 60*a*. The screw pin 64 is moved by a mechanism described below to turn on the micro switch 69*a*. The developing unit 7*a* also includes a screw pin 74, protruding from the front surface of the developing unit 7*a*, for activating the micro switch 79*a*, and an intermediate roller 73.

A cross-sectional view around the screw pin 64 of the latent image carrying unit 60*a* is illustrated in FIGS. 5A and 5B. In particular, FIG. 5A illustrates the screw pin 64 in conditions that the latent image carrying unit 60*a* is newly installed and the charging roller 62 of the latent image carrying unit 60*a* is not driven for rotation yet, and FIG. 5B illustrates the screw pin 64 in conditions that the charging roller 62 of the latent image carrying unit 60*a* has already been driven for rotation. The screw pin 64 includes a top pin 64*p*, a male thread 64*s*, and a foot 64*b*, as illustrated in FIG. 5A. Approximately one third of the foot 64*b*, as measured from its one end closer to the charging roller 62, has a circular shape in cross-section, and the remaining approximately two thirds of the foot 64*b* has a square shape in cross-section.

The charging roller 62 for evenly charging the surface of the photosensitive drum 6*a* is held in contact with the photosensitive drum 6*a* and is rotated at a circumferential velocity substantially equal to that of the photosensitive drum 6*a*. The surface of the charging roller 62 is cleaned by the cleaning pad 63. The charging roller 62 has a rotation shaft 62*a* that is held for rotation with a front-side supporting plate 68 of the latent image carrying unit 60*a* via a bearing supporter 68*a*. A connection sleeve 65 is mounted to the end of the rotation shaft 62*a* and is rotated together with the rotation shaft 62*a*. The connection sleeve 65 has in its center a through-hole of square cross-section, in which the above-mentioned foot 64*b* of the screw pin 64 is engaged. The top pin 64*p* of the screw pin 64 protrudes from a front unit cover 67 provided on the latent image carrying unit 60*a*.

As illustrated in FIG. 5A, when the latent image carrying unit 60*a* is newly installed and is not used, the male thread 64*s* is engaged in a female thread provided on the front unit cover 67 so as to press a coil spring 66 against the connection sleeve 65. Under this condition, a relatively small portion of the screw pin 64 protrudes from the front unit cover 67. However, once the charging roller 62 is rotated, the screw pin 64 is caused to rotate so that the top pin 64*p* is moved towards the micro switch 69*a*. As the screw pin 64 is rotated, the top pin 64*p* is caused to push a button 69*n* of the micro switch 69*a* and the male thread 64*s* is released from engagement with the female thread of the front unit cover 67. Immediately before the male thread 64*s* is released from engagement with the female thread of the front unit cover 67, the micro switch 69*a* which is normally in an off-state is turned on.

As illustrated in FIG. 5B, after the male thread 64*s* is released from engagement with the female thread of the front unit cover 67, the screw pin 64 is pushed towards the micro switch 69*a* by the coil spring 66. Accordingly, the foot 64*b* is released from engagement of the square cross-section portion thereof with the square through-hole of the connection sleeve 65. Therefore, the spring pin 64 is not caused to rotate by the rotation of the charging roller 62.

In this way, the micro switch 69*a* is kept in an off-state from the time the latent image carrying unit 60*a* is new until the latent image carrying unit 60*a* is installed in the color printer 400 and main power is applied to the color printer 400. Upon application of the main power to the color printer 400, the charging roller 62 is rotated and the micro switch 69*a* is switched to an on-state by the movement of the screw pin 64, as described above. That is, when the state of the micro switch 69*a* is changed from an off-state to an on-state by an application of the main power to the color printer 400, it is understood that the latent image carrying unit 60*a* is replaced by a new unit before the application of the main power to the color printer 400.

In the developing unit 7*a*, the intermediate roller 73 and the screw pin 74 are provided with mechanisms similar to those provided, as described above, to the charging roller 62 and the screw pin 64 of the latent image carrying unit 60*a*, and are arranged to operate in a manner similar to that in which the charging roller 62 and the screw pin 64 of the latent image carrying unit 60*a* are arranged to operate.

Figure 6:
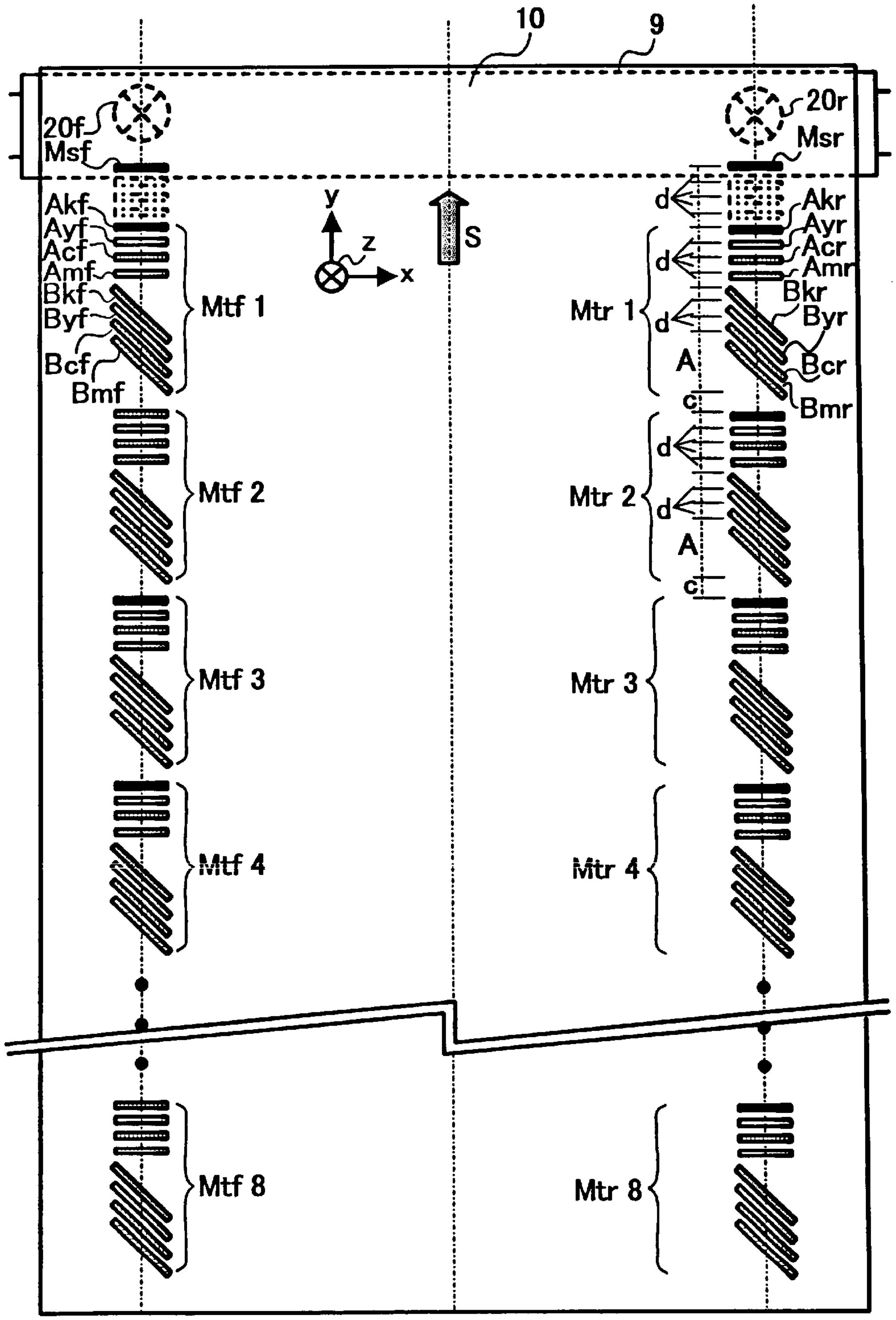
FIG. 6 is an illustration for explaining a predetermined test pattern formed on a transfer belt.

Referring now to FIG. 6, a color displacement check operation using the test patterns formed on the transfer belt 10 is explained. The above-described color printer 400 performs a color displacement check operation for correcting for erroneous color displacements among the overlaid colors using the test patterns of FIG. 6. As illustrated in FIG. 6, the test pattern that is formed on the transfer belt 10 held by the driving roller 9 includes front and rear test patterns. For example, the rear test pattern includes one start mark Msr and eight rear mark sets Mtr1–Mtr8. There is a vertical distance of four times a pitch d between the start mark Msr and the rear set Mtr1. Each of the rear mark sets Mtr1–Mtr8 has a vertical distance of seven times the pitch d and a vertical distance A. There is a vertical distance of a pitch c between two adjacent rear mark sets.

For example, the rear set Mtr1 includes a set of marks Akr, Ayr, Acr, and Amr orthogonal to a sheet travel direction indicated by an arrow S and a set of marks Bkr, Byr, Bcr, and Bmr having a 45-degree slant relative to the sheet travel direction S. The marks Akr, Ayr, Acr, and Amr represents the Bk, Y, C, and M colors, respectively, and the marks Bkr, Byr, Bcr, and Bmr also represents the Bk, Y, C, and M colors. The rear sets Mtr2–Mtr8 are configured in a manner similar to that in which the rear set Mtr1 is configured, as illustrated in FIG. 6.

As illustrated in FIG. 6, the front test pattern includes a start mark Msf and front sets Mtf1–Mtf8 that are configured in a manner similar to that in which the rear test pattern is configured.

In FIG. 6, each of the reflective optical sensors 20*f* and 20*r* disposed behind the driving roller 9 is indicated with a circle with a cross mark in dashed-lines.

Figure 7:
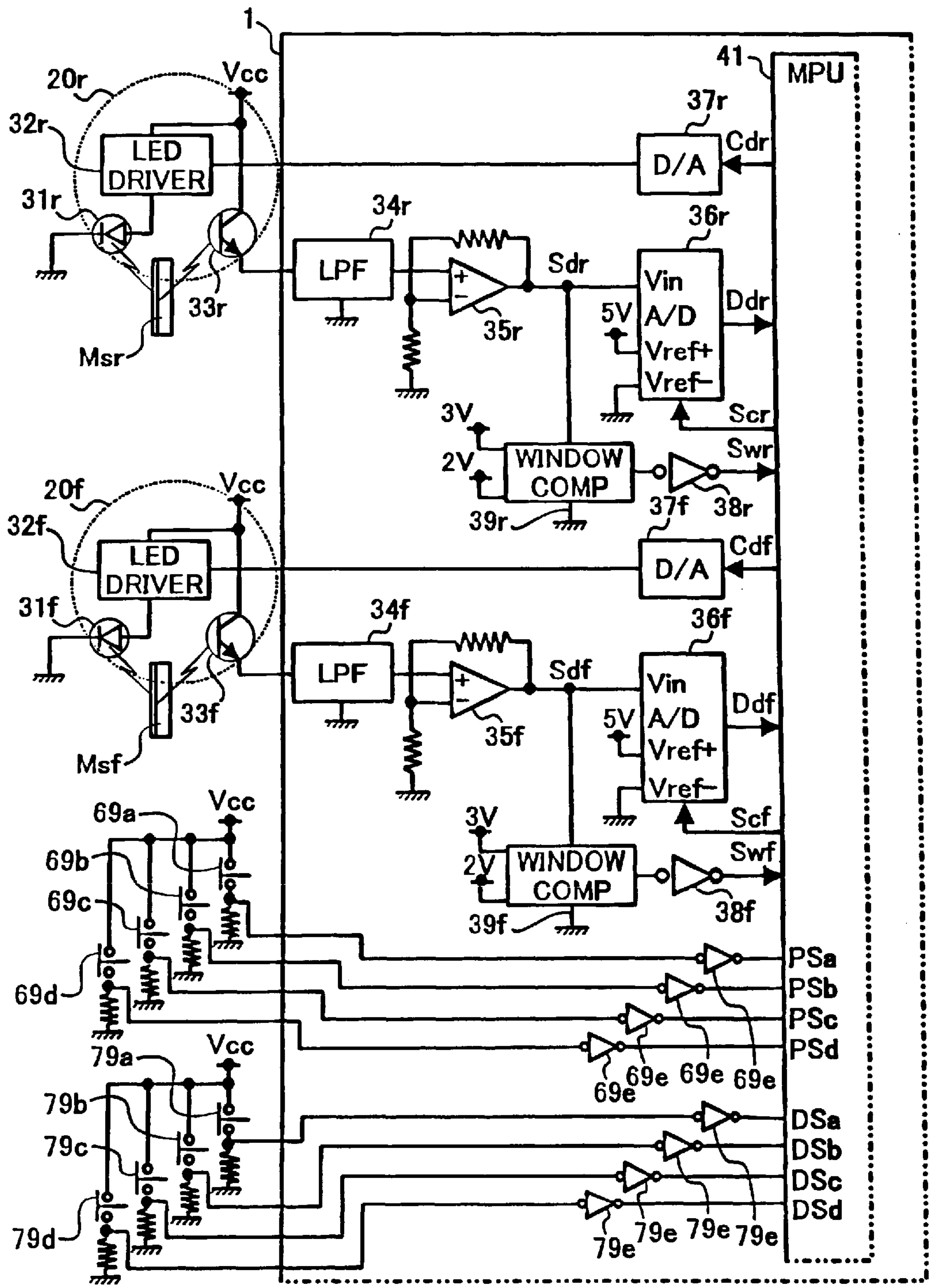
FIG. 7 is a circuit diagram of reflective optical sensors, micro switches, and a part of a process controller included in the color printer of FIG. 2.

Referring to FIG. 7, electrical circuits for receiving signals from the reflective optical sensors 20*f* and 20*r* and the micro switches 69*a*–69*d* and 79*a*–79*d* will now be explained. As illustrated in FIG. 7, the reflective optical sensor 20*r* includes an LED (light-emitting diode) 31*r*, an LED driver 32*r*, and a phototransistor 33*r*. The LED driver 32*r* and the transistor 33*r* are connected to a common source voltage Vcc. Likewise, the reflective optical sensor 20*f* includes an LED (light-emitting diode) 31*f*, an LED driver 32*f*, and a transistor 33*f*. The LED driver 32*f* and the transistor 33*f* are connected to the common source voltage Vcc. The process controller 1 of the color printer 400 is provided with an MPU (micro processing unit) 41 composed of various components including a ROM, a RAM, a CPU, a FIFO (first-in and first-out) memory, etc., which are not shown. Further, the process controller 1 is provided for the reflective optical sensor 20*r* with a set of components including a low-pass filter (LPF) 34*r*, an operational amplifier 35*r*, an A/D (analog-to-digital) converter 36*r*, a D/A (digital-to-analog) converter 37*r*, a buffer element 38*r*, and a window comparator 39*r*. Further, the process controller 1 is provided for the reflective optical sensor 20*f* with a set of components including a low-pass filter (LPF) 34*f*, an operational amplifier 35*f*, an A/D (analog-to-digital) converter 36*f*, a D/A (digital-to-analog) converter 37*f*, a buffer element 38*f*, and a window comparator 39*f*. Further, the process controller 1 is provided with four buffer elements 69*e* and four buffer elements 79*e*.

The following discussion focuses on a rear mark detection operation for detecting the rear test pattern, as an example, for convenience sake, since a front mark detection operation for detecting the front test pattern operates in a manner similar to the rear mark detection operation, merely differing in the front and rear positions.

For the reflective optical sensor 20*r*, the MPU 41 is configured to send to the D/A converter 37*r* a control signal Cdr representing data for designating an appropriate current value for the LED (Light Emitting Diode) 31*r* of the reflective optical sensor 20*r*. The D/A converter 37*r* converts the control signal Cdr into an analog voltage and transmits the analog voltage to the LED driver 32*r* so that the LED driver 32*r* drives the LED 31*r* with a current in proportion to the analog voltage and the LED 31*r* emits light, as a result.

The light emitted from the LED 31*r* passes through a slit (not shown) and impinges on the transfer belt 10. At this time, a major part of the light passes through the transfer belt 10 and is reflected by the reflection plate 21. The reflected light again passes through the transfer belt 10 and, after passing through a slit (not shown), falls on the phototransistor 33*r*. Thereby, the impedance between the collector and the emitter of the phototransistor 33*r* becomes relatively low and the potential of the emitter is increased. When the above-described start mark Msr, for example, is brought to a position facing the phototransistor 33*r*, the light is obstructed by the start mark Msr. Thereby, the collector-emitter impedance of the phototransistor 33*r* becomes relatively high and the emitter potential is decreased. That is, the level of the detection signal output from the reflective optical sensor 20*r* is reduced. In this way, the reflective optical sensor 20*r* detects the mark and changes its output signal from high (H) to low (L) when the high level represents no mark reading and the low level represents a mark reading.

Figure 8:
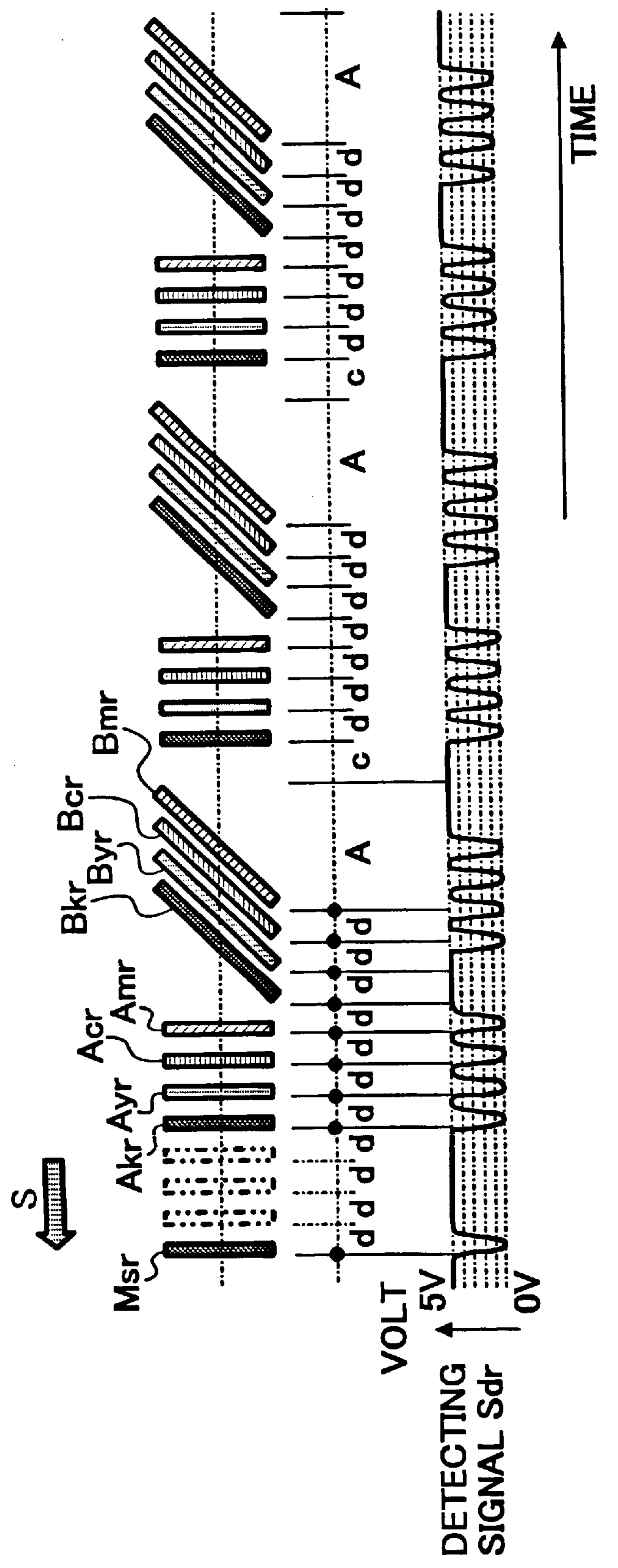
FIG. 8 is an illustration for explaining a detection signal output in accordance with readings of the predetermined test pattern shown in FIG. 6.

The detection signal from the reflective optical sensor 20*r* is passed through the LPF 34*r* for cutting off relatively high frequency noises and is input to the operational amplifier 35*r* that corrects for the level of the detection signal into a range between 0 volts and 5 volts. A resultant detection signal Sdr output from the operational amplifier 35*r* is input to the A/D converter 36*r* that converts the analog signal into a digital signal Ddr and sends the digital signal Ddr to the MPU 41. The detection signal Sdr is also input to the window comparator 39*r*. FIG. 8 illustrates an exemplary signal form of the above-mentioned detection signal Sdr after the correction by the operational amplifier 35*r* in relation to the positions of the rear test pattern, for example, formed on the transfer belt 10.

The AID converter 36*r* internally includes sample/hold circuits (not shown) arranged at an input side and data latches (not shown) arranged at an output side. When the MPU 41 gives an instruction signal Scr for instructing execution of an A/D conversion to the A/D converter 36*r*, the A/D converter 36*r* holds a voltage of the then detection signal Sdr, converts it into the digital signal Ddr representing digital detection data (referred to as detection data Ddr), and stores the detection data Ddr in the data latches. Then, the MPU 41 reads the detection data Ddr, which represents in a digital data form the voltage level of the detection signal Sdr, from the data latches of the A/D converter 36*r*.

The window comparator 39*r* determines whether the detection signal Sdr is within a predetermined voltage range, for example between 2 volts and 3 volts, and outputs a mark edge signal Swr that is sent to the MPU 41 via the buffer element 38*r*. When the detection signal Sdr is determined as within the predetermined voltage range, for example between 2 volts and 3 volts, the window comparator 39*r* outputs the mark edge signal Swr as a low (L) level signal. When the detection signal Sdr is determined as not within the predetermined voltage range, for example between 2 volts and 3 volts, the window comparator 39*r* outputs the mark edge signal Swr as a high (H) level signal. By referring to the mark edge signal Swr, the MPU 41 can accordingly determine whether the detection signal Sdr is within the predetermined voltage range, for example between 2 volts and 3 volts.

In FIG. 7, each of the micro switches 69*a*–69*d* has one terminal connected to the source voltage Vcc and another terminal connected to the MPU 41 via the buffer element 69*e*. Output signals from the micro switches 69*a*, 69*b*, 69*c*, and 69*d* correspond to switching status signals PSa, PSb, PSc, and PSd, respectively. Accordingly, the MPU 41 can determine the switching status of the micro switches 69*a*–69*d* by reading the switching status signals PSa, PSb, PSc, and PSd. Also, each of the micro switches 79*a*–79*d* has one terminal connected to the source voltage Vcc and another terminal connected to the MPU 41 via the buffer element 79*e*. Output signals from the micro switches 79*a*, 79*b*, 79*c*, and 79*d* correspond to switching status signals DSa, DSb, DSc, and DSd, respectively. Accordingly, the MPU 41 can determine the switching status of the micro switches 79*a*–79*d* by reading the switching status signals DSa, DSb, DSc, and DSd.

Figure 9A:
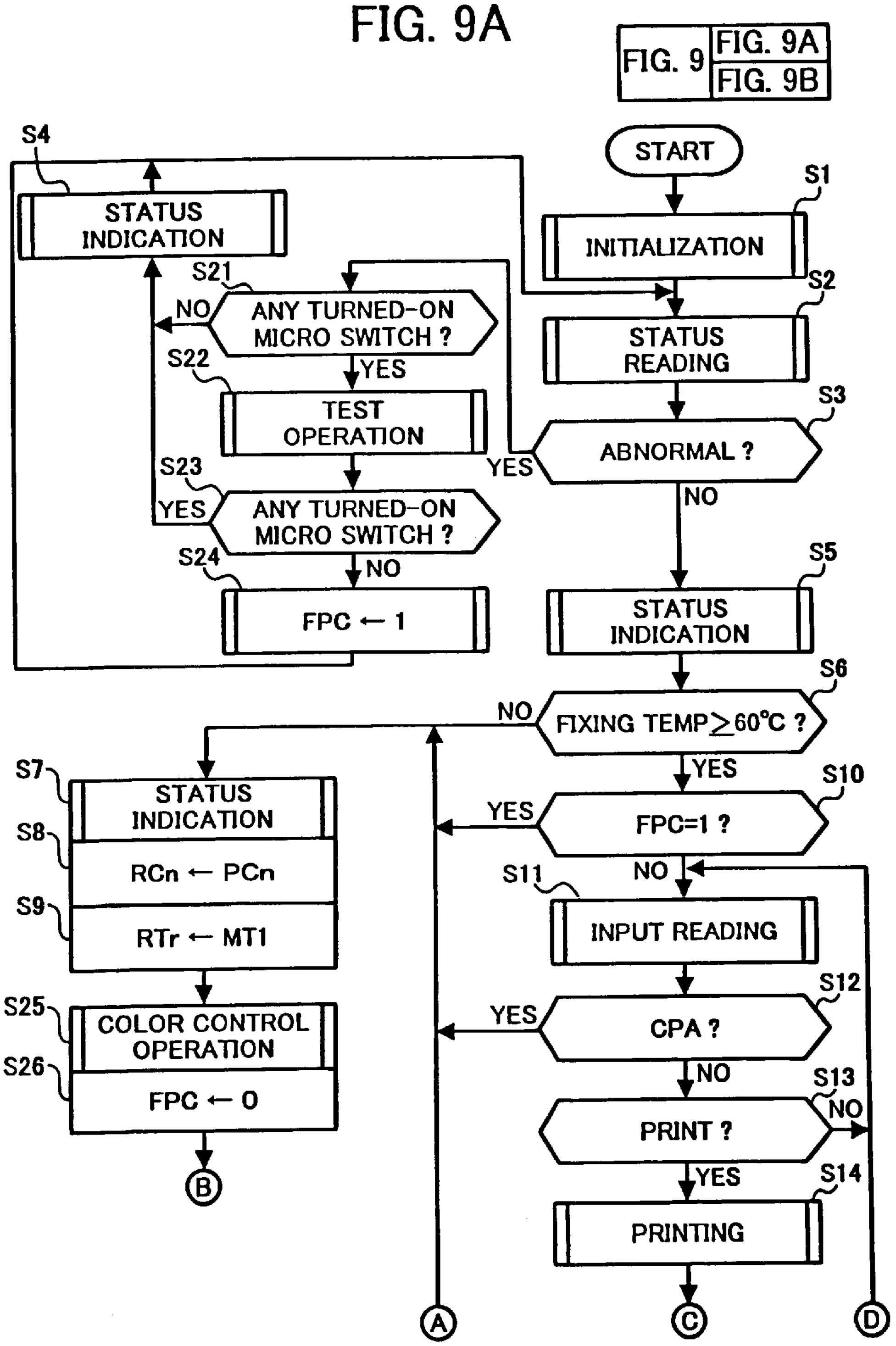
FIGS. 9A and 9B is a flowchart for explaining an exemplary procedure of a print control operation for controlling a printer engine of the color printer of FIG. 2.
Figure 9B:
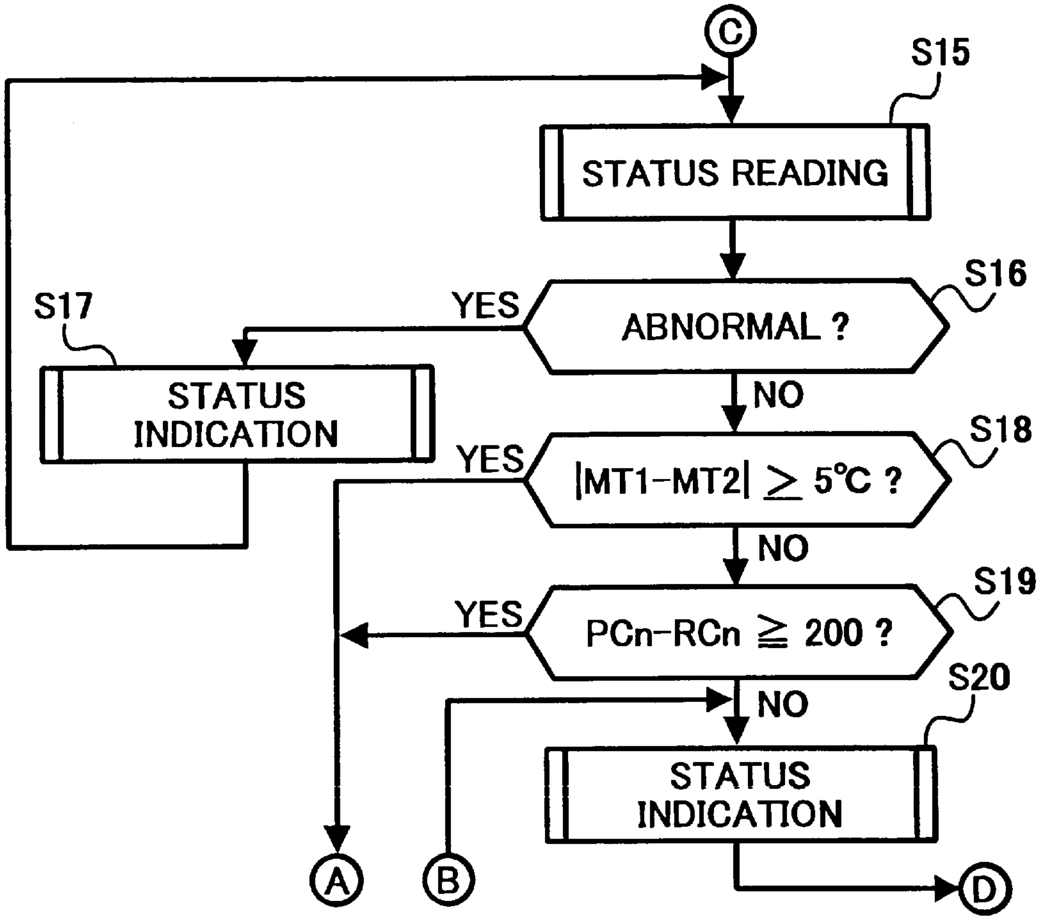

Referring to FIGS. 9A and 9B, an exemplary procedure of a print control operation for controlling the printer engine 4 of the color printer 400 is explained. In Step S1 of a print control flowchart of FIGS. 9A and 9B, the MPU 41 performs an initialization process when applied with an operational voltage. In the initialization process, the MPU 41 sets signal levels of input and output ports to standby levels and also sets internal registers and timers to standby modes.

The MPU 41 reads the status of mechanical units and electrical circuits in Step S2, and determines in Step S3 whether the states read include any abnormal states that obstruct the image forming process. If the states read are determined not to include abnormal states and the determination result of Step S3 is NO, the process proceeds to Step S5. If the states read are determined to include an abnormal state and the determination result of Step S3 is YES, the MPU 41 proceeds with the process to Step S21. In Step S21, the MPU 41 checks whether any one of the micro switches 69*a*–69*d* and 79*a*–79*d* is in the turned-on state. When any one of the micro switches is checked as not in the turned-on state and the check result of Step S21 NO, the MPU 41 recognizes an occurrence of an abnormal event other than that related to the micro switches 69*a*–69*d* and 79*a*–79*d* and accordingly proceeds to Step S4. In Step S4, the MPU 41 performs an abnormal event indication for indicating the abnormal event on the control panel 800. After the process of Step S4, the MPU 41 repeats the process of Step S2 until the abnormal event is resolved.

When any one of the micro switches is checked as in the turned-on state and the check result of Step S21 is YES, the MPU 41 proceeds with the process to Step S22. When any one of the micro switches is in the turned-on state, it involves one of the following two cases. In the first case, the latent image carrying unit or the developing unit located at the position corresponding to the micro switch in the turned-on state does not exist at the position. In the second case, the latent image carrying unit or the developing unit located at the position corresponding to the micro switch in the turned-on state is one that is newly installed and has never been used.

To clarify the cases, the MPU 41 executes in Step S22 a test operation for preliminarily driving the image forming mechanism. Accordingly, the components and units included in the image forming mechanism are driven to rotate, including the transfer belt 10, the photosensitive drums 6*a*–6*d*, the corresponding charging rollers 62, the developing rollers 72 of the developing units 7*a*–7*d,* and so on. If the case is determined to be the second case, that is if the latent image carrying unit or the developing unit located at the position corresponding to the micro switch in the turned-on state is one that is newly installed and has never been used, the micro switch in the turned-on state must be switched to the turned-off state through the test operation. If the case is determined to be the first case, that is the latent image carrying unit or the developing unit located at the position corresponding to the micro switch in the turned-on state does not exist in the position, the status of the micro switch is unchanged through the test operation.

After the test operation in Step S22, the MPU 41 again checks if any one of the micro switches 69*a*–69*d* or 79*a*–79*d* is in the turned-on state, to determine whether the micro switch in the turned-on state found in Step S21 is changed into the turned-off state by the test operation. If the micro switch in the turned-on state is checked and has changed into the turned-off state and the check result of Step S23 is NO, the process proceeds to Step S24. For example, when the micro switch 69*d* for detecting the existence of the latent image carrying unit 60*d* for the Bk color is checked in Step S23 as switched from the turned-on to the turned-off state, the MPU 41 performs a print register initialization of in Step S24. In the print register initialization of Step S24, in this case, the MPU 41 initializes a Bk print register, assigned for the Bk print in a nonvolatile memory, for accumulating the number of Bk print performance times so that accumulation data stored in the Bk print register is set to 0 and to write 1 in a register FPC of the MPU 41 to indicate a status that the latent image carrying unit is exchanged. After that, the MPU 41 repeats the process of Step S2 to restart the operation.

If the micro switch in the turned-on state is detected as still in the turned-on state and the check result of Step S23 is YES, the MPU 41 recognizes that the unit corresponding to the micro switch checked as maintained in the turned-on state is not installed and proceeds to Step S4. In Step S4, the MPU 41 performs an abnormal event notification for notifying the system controller 26 of the occurrence that the unit corresponding to the micro switch checked as maintained in the turned-on state is not installed. After the process of Step S4, the MPU 41 repeats the process of Step S2 until the abnormal event is resolved.

After determining in Step S3 that the states read include no abnormal state, the MPU 41 in Step S5 prepares the fixing unit 12. In Step S5, the MPU 41 starts to energize the fixing unit 12 and checks if the fixing unit 12 is energized to have a predetermined fixing temperature at which the fixing unit 12 can perform the fixing operation. When the fixing unit 12 has not attained the predetermined fixing temperature, the MPU 41 indicates on the control panel 800 that the color printer 400 is in a standby state. When the fixing unit 12 has attained the predetermined fixing temperature, the MPU 41 indicates on the control panel 800 that the color printer 400 is in a ready state.

Then, in Step S6, the MPU 41 checks whether the fixing temperature of the fixing unit 12 is higher than 60 degrees Celsius, for example. If the fixing temperature is checked and found to be not higher than 60 degrees Celsius, for example, and the check result of Step S6 is NO, the MPU 41 determines that power has been applied to the color multi-function apparatus 200 after a relatively long time period of non-use, such as upon an application of the power for the first time in the morning, for example. Consequently, the MPU 41 judges that changes of environmental conditions inside the color printer 400 might be great. Therefore, the MPU 41 proceeds with the process to Step S7 and indicates on the control panel 800 that a color print adjustment (CPA) is under execution. In Step S8, the MPU 41 writes a value PCn stored in a total color print register PCn of the non-volatile memory into a total color print register RCn of the MPU 41. The value PCn represents an accumulated number of times that the color image forming operation has been performed. In Step S9, the MPU 41 writes a value MT1 that represents a present value of a machine inside temperature of the color printer 400 into a register RTr of the MPU 41. After that, the MPU 41 executes a color control operation including the color print adjustment in Step S25. Upon completion of the color control operation in Step S25, the MPU 41 clears the register FPC to 0 in Step S26. The color control will be explained in further detail later.

If the fixing temperature is checked and found to be higher than 60 degrees Celsius, for example, and the check result of Step S6 is YES, the MPU 41 determines that power has been applied to the color multi-function apparatus 200 a relatively short time after the previous power-off action, for example. Consequently, the MPU 41 judges that the changes in environmental conditions inside the color printer 400 since the previous power-off action might be small, for example. However, it may be possible that any one of the latent image carrying units 60a–60d or any one of the developing units 7a–7d has been exchanged. Therefore, the MPU 41 proceeds with the process to Step S10 to check if the information representing the unit exchange is generated and is written in the register FPC in Step S24. That is, the MPU 41 checks in Step S10 whether the data in the register FPC is 1. If the data in the register FPC is checked and found to be 1 and the check result of Step S10 is YES, the MPU 41 performs the processes of Steps S7–S9 and executes the color control operation in Step S25.

If the data of the register FPC is checked and is not 1 and the check result of Step S10 is NO, the MPU 41 recognizes that none of the latent image carrying units 60a–60d and none of the developing units 7a–7d have been exchanged. In this case, the MPU 41 waits in a process of Step S11 for a user instruction input through the control panel 800 or a command sent from the PC 300. When the MPU 41 detects a user instruction in Step S11, the process proceeds to Step S12. In Step S12, the MPU 41 determines whether the user instruction detected in Step S11 is a color print adjustment. If the determination result of Step S12 is YES, the MPU 41 performs the processes of Steps S7–S9 and executes the color control operation in Step S25.

If the determination result of Step S12 is NO, that is, the user instruction detected in Step S11 is checked as not a color print adjustment, the MPU 41 checks if the user instruction detected in Step S11 is a copy start instruction as the user instruction input through the control panel 800 or a print instruction from the system controller 26 corresponding to the print command from the PC 300. If the user instruction is checked and is a copy start instruction, for example, and the check result of Step S13 is YES, the MPU 41 executes in Step S14 an image forming operation to reproduce a designated number of copies. If the image forming operation performed in Step S14 is color image forming, the MPU 41 increments various registers of the nonvolatile memory by 1, each time color image forming is performed. The registers to be incremented include a total print register, the total color print register PCn, and the Bk, Y, C, and M total print registers. If the image forming operation performed in Step S14 is mono-chrome image forming, the MPU 41 increments by 1 various registers of the nonvolatile memory each time the mono-chrome image forming is performed. In this case, the registers to be incremented include the total print register, a total mono-chrome print register, and the Bk color print register.

When the latent image carrying units 60a–60d for the Bk, Y, C, and M colors, respectively, are exchanged with new units, the Bk, Y, C, and M print registers are cleared to 0.

If the user instruction detected in Step S11 is checked as neither a copy start instruction nor a print instruction and the check result of Step S13 is NO, the process returns to Step S11 to further wait for a user instruction or a PC command.

In addition to a check for abnormal operations including troubles related to paper each time image forming is performed, upon completion of image forming for a designated performance time, the MPU 41 reads a development density, the fixing temperature, the machine inside temperature, and the status of various components and units, in Step S15. Based on the readings in Step S15, the MPU 41 determines if the color printer 400 causes any abnormal event, in Step S16. If the color printer 400 is determined to be causing an abnormal event and the determination result of Step S16 is YES, the MPU 41 indicates the abnormal event on the control panel 800, in Step S17. The processes of Steps S15–S17 are repeated until the abnormal event is resolved.

If the color printer 400 is determined not to be causing an abnormal event and the determination result of Step S16 is NO, the MPU 41 proceeds to Step S18. In Step S18, the MPU 41 examines if the present machine inside temperature is changed from that during the last color print adjustment by, for example, 5 degrees Celsius or greater. That is, the MPU 41 compares a value MT2 representing the present machine inside temperature with the value MT1 of the register RTr representing the machine inside temperature at the last color print adjustment. If the present machine inside temperature is determined to have changed from that during the last color print adjustment by, for example, 5 degrees Celsius or greater and the examination result of Step S18 is YES, the MPU 41 performs the processes of Steps S7–S9 and executes the color control operation in Step S25. If the present machine inside temperature is determined not to have changed from that during the last color print adjustment by, for example, 5 degrees Celsius or greater and the examination result of Step S18 is NO, the process proceeds to Step S19.

In Step S19, the MPU 41 examines whether the total number of color prints performed is greater than that at the last color print adjustment by, for example, 200 prints. That is, the MPU 41 compares the value PCn stored in the total color print register PCn of the nonvolatile memory with the value PCn stored in the total color print register RCn of the MPU 41. If the total number of color prints performed is determined to be greater than that at the last color print adjustment by, for example, 200 prints and the examination result of Step S19 is YES, the MPU 41 performs the processes of Steps S7–S9 and executes the color control operation in Step S25. If the total number of color prints performed is determined not to be greater than that at the last color print adjustment by, for example, 200 prints and the examination result of Step S19 is NO, the process proceeds to Step S20.

In Step S20, the MPU checks if the fixing unit 12 has attained the predetermined fixing temperature at which the fixing unit 12 can perform the fixing operation. When the fixing unit 12 has not attained the predetermined fixing temperature, the MPU 41 indicates on the control panel 800 that the color printer 400 is in a standby state. When the fixing unit 12 has attained the predetermined fixing temperature, the MPU 41 indicates on the control panel 800 that the color printer 400 is in a ready state. Then, the MPU 41 returns the process to Step S11 to wait for the next instruction.

In the way described above, the color printer 400 performs the print control operation.

In the above described print control operation, the color printer 400 performs the color control operation at various occasions. For example, the occasions can be summarized as when power is applied to the color printer 400 with the fixing temperature below, for example, 60 degrees Celsius, when one of the latent image carrying units 60a–60d or one of the developing units 7a–7d is exchanged for a new unit, or when an instruction for performing the color print adjustment is input through the control panel 800. Further, the occasions can be summarized as when the machine inside temperature is changed from that of the last color adjustment performance by, for example, 5 degrees Celsius or greater after a completion of the image forming operation for a designated number of prints, and when the accumulated total number of color prints performed, represented by the value PCn, is greater than that of the last color adjustment performance by, for example, 200 prints or greater after a completion of the image forming operation for a designated number of prints.

Figure 10A:
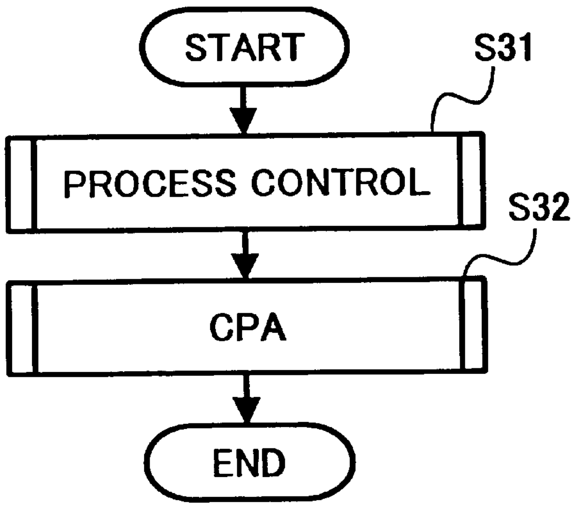
FIGS. 10A and 10B are flowcharts for explaining exemplary procedures of a color control operation and a color print adjustment performed by the color printer of FIG. 2.

As shown in FIG. 10A, the color control operation executed in Step S25 of FIGS. 9A and 9B includes process modules of a process control in Step S31 and the color print adjustment (CPA) in Step S32. In Step S31, the MPU 41 sets the conditions of the image forming processes, including charging, exposing, developing, transferring, etc., to basic reference values. At the same time, the MPU 41 conducts the image forming operation to form a predetermined Bk, Y, C, and M color image at least on the front or rear side of the transfer belt 10. By detecting the density of the predetermined Bk, Y, C, and M color image using the reflective optical sensors 20*f* and 20*r*, the MPU 41 adjusts a voltage applied to the charging roller 62, an exposure intensity of the optical writing unit 5, and bias voltages of the developing units 7*a*–7*d* so that the density of the predetermined Bk, Y, C, and M color image have a value substantially equal to a basic reference value. After a completion of the process control, the MPU 41 performs the color print adjustment (CPA), in Step S32.

Figure 10B:
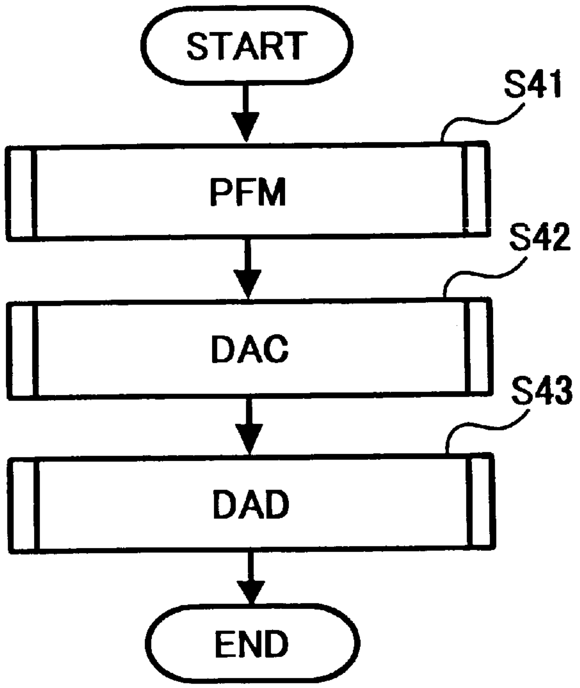

FIG. 10B shows an exemplary procedure for the color print adjustment (CPA) performed by the MPU 41 in Step S32 of FIG. 10A. In Step S41 of FIG. 10B, the MPU 41 performs a process referred to as pattern forming and measurement (PFM). In the PFM of Step S41, the MPU 41 conducts the image forming operation to form the front and rear test patterns on the front and rear sides, respectively, of the transfer belt 10. Further, the MPU 41 conducts mark detection to read the respective test marks with the reflective optical sensors 20*f* and 20*r*, and to convert the detection signals Sdf and Sdr with the A/D converter 36*f* and 36*r*, respectively, into the digital signals Ddf and Ddr. Then, the MPU 41 calculates a position of a center point of each mark on the transfer belt 10 to obtain average values of the eight set mark positions with respect to the rear test pattern. Based on the average values, the MPU 41 calculates an average pattern of the average values of the eight set mark positions for the rear test pattern. After that, the MPU 41 calculates an average pattern of the eight set mark positions for the front test pattern. Further details of the PFM is explained later with reference to FIG. 11.

On a basis of the calculated average pattern, the MPU 41 conducts in Step S42 a displacement calculation process DAC to figure out displacement amounts of the test mark positions due to the respective Bk, Y, C, and M image forming mechanisms. Then, in Step S43, the MPU 41 conducts a displacement adjustment process DAD to eliminate the displacements based on the displacement amounts calculated in Step S42. Details of the above-mentioned calculation DAC and adjustment DAD will be explained later.

Figure 11:
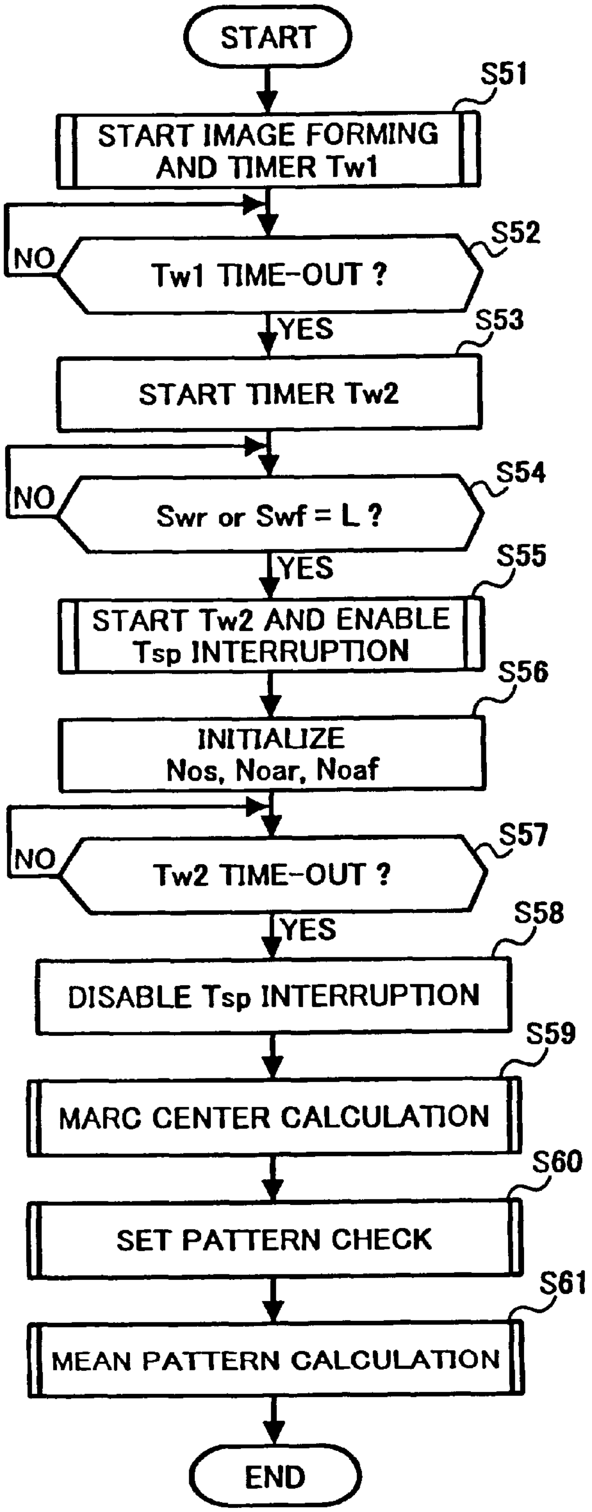
FIG. 11 is a flowchart for explaining a pattern forming and measurement performed by the color printer of FIG. 2.

Referring to FIG. 11, an exemplary procedure of the pattern forming and measurement (PFM) performed in Step S41 of FIG. 10B is explained. In this exemplary procedure of the pattern forming and measurement, the MPU 41 conducts image forming to form the front and rear test patterns, as illustrated in FIG. 6, at the same time on the front and rear surface sides of the transfer belt 10 that is driven to move in the sheet travel direction S at a constant speed of 125 mm/s, for example. Each of the marks including the start marks Msf and Msr and the marks of the eight front and rear mark sets has in the direction y a width W of 1 mm, for example, and in the direction x a length L of 20 mm, for example. The pitch d is 6 mm, for example. The distance c between two adjacent rear mark sets is 9 mm, for example, and the distance A is 24 mm, for example.

In Step S51 of FIG. 11, the MPU 41 starts a timer TW1 for counting a time TW1 to detect a time immediately before the start marks Msr and Msf are brought right under the reflective optical sensors 20*r* and 20*f*, respectively. The MPU 41 waits until the timer TW1 counts the time TW1 and causes a time-out, in Step S52. Immediately after the timer TW1 causes a time-out after counting the time TW1, the MPU 41 starts in Step S53 a timer TW2 for counting a time TW2 to detect a time immediately after the last marks of the eight mark sets included in the respective front and rear test patterns are caused to pass the reflective optical sensors 20*r* and 20*f*, respectively.

Figure 12:
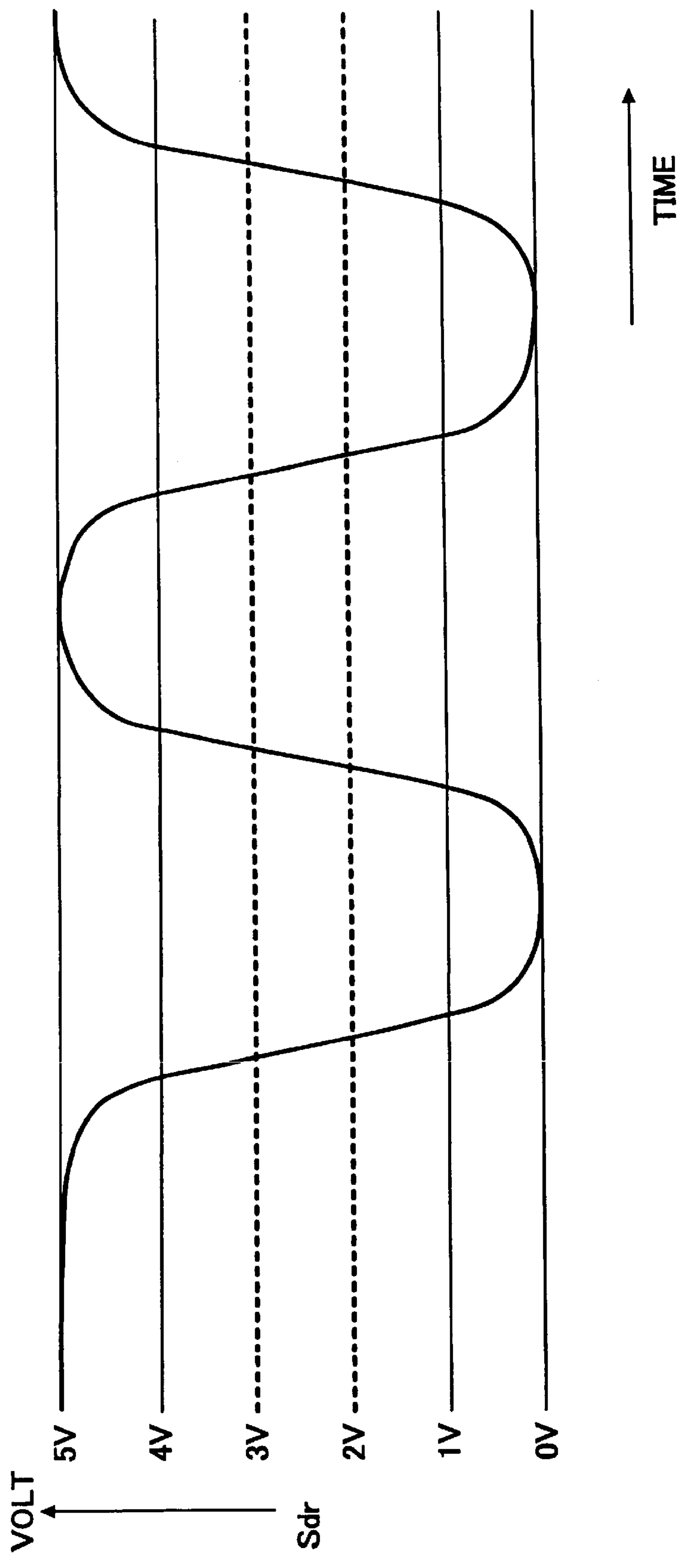
FIG. 12 is a time chart for explaining a signal level of a detection signal.

As described above, when the reflective optical sensors 20*f* and 20*r* read no marks of the Bk, Y, C, and M colors, the detection signals Sdf and Sdr, respectively, are made to be logical high (H) signals having 5 volts. When the reflective optical sensors 20*f* and 20*r* read the marks of the Bk, Y, C, and M colors, the detection signals Sdf and Sdr, respectively, are made to be logical low (L) signals having 0 volts. The detection signals Sdf and Sdr are thus vertically varied and, in addition, these signals are shifted in a time-axis direction according to the movement of the transfer belt 10, thereby having the waveform as illustrated in FIG. 8. A part of the signal Sdr of FIG. 8 is shown in FIG. 12 in an enlarged form. In FIG. 12, the waveform of the detection signal Sdr, as an example, has descending and ascending lines that correspond to leading and trailing edges, respectively, of the mark. Therefore, a signal area between the descending and ascending lines corresponds to the area of the mark having the width W.

In Step S54 of FIG. 11, the MPU 41 checks if at least one of the mark edge signals Swr and Swf is changed from H to L in order to observe an occurrence that a leading edge of at least one of the start marks Msr and Msf has been brought into the view fields of the reflective optical sensors 20*r* and 20*f*, respectively, after the start marks Msr and Msf are brought into the view fields of the reflective optical sensors 20*r* and 20*f*, respectively. That is, when the mark edge signals Swr and Swf output from the window comparators 39*r* and 39*f*, respectively, are low (L) signals, they indicate that the detection signals Sdr and Sdf have voltages in the 2 to 3 volt range. This indicates that at least one of the start marks Msr and Msf is brought into the view fields of the reflective optical sensors 20*r* and 20*f*.

When the MPU 41 detects at least one of the start marks Msr and Msf and the check result of Step S54 is YES, the MPU 41 proceeds to Step S55 to start a timer Tsp for counting a time Tsp of 50 ms, for example, and to enable a timer-Tsp interruption for performing a timer interruption process TIP (FIG. 13) immediately after the timer Tsp causes a time-out. In Step S56, the MPU 41 initializes a register Nos for registering a number of sampling times so as to set a number Nos of sampling times to 0. The MPU 41 also initializes an address Noaf to a start address. The address Noaf designates an address for data writing in a memory area f assigned in the FIFO memory of the MPU 41 for storing detection data with respect to the marks of the front test pattern. Thereby, the MPU 41 can write the detection data of the front test pattern marks from the start address in the memory area f. Likewise, the MPU 41 initializes an address Noar to a start address in order to write detection data with respect to the marks of the rear test pattern from the start address in a memory area f assigned in the FIFO memory of the MPU 41. After that, in Step S57, the MPU 41 checks if the timer Tw2 causes a time-out. That is, the MPU 41 waits until the eight mark sets of the front and rear test patterns are passed through the view fields of the reflective optical sensors 20*f* and 20*r*.

After detecting a time-out of the timer Tw2, the MPU 41 disables the timer-Tsp interruption, in Step S58. At this point, the A/D) conversion of the detection signals Sdr and Sdf performed in the period of time Tsp is stopped, which is explained later with reference to FIG. 13. After that, the MPU 41 performs a mark center arithmetic (MCA) process, in Step S59. In the process MCA, the MPU 41 calculates center points of the marks based on the detection data Ddr and Ddf stored in the memory areas r and f of the FIFO memory of the MPU 41, which will be further explained later. Then, in Step S60, the MPU 41 conducts a set pattern confirmation (SPC) process in which the MPU 41 checks whether the calculated patterns of the mark centers with respect to the eight mark sets of the respective front and rear test patterns are appropriate, and eliminates patterns checked as not appropriate. Based on the appropriate patterns checked through the process of Step S60, the MPU 41 performs a mean pattern arithmetic (MPA) process for making a mean pattern, in Step S61.

Figure 13:
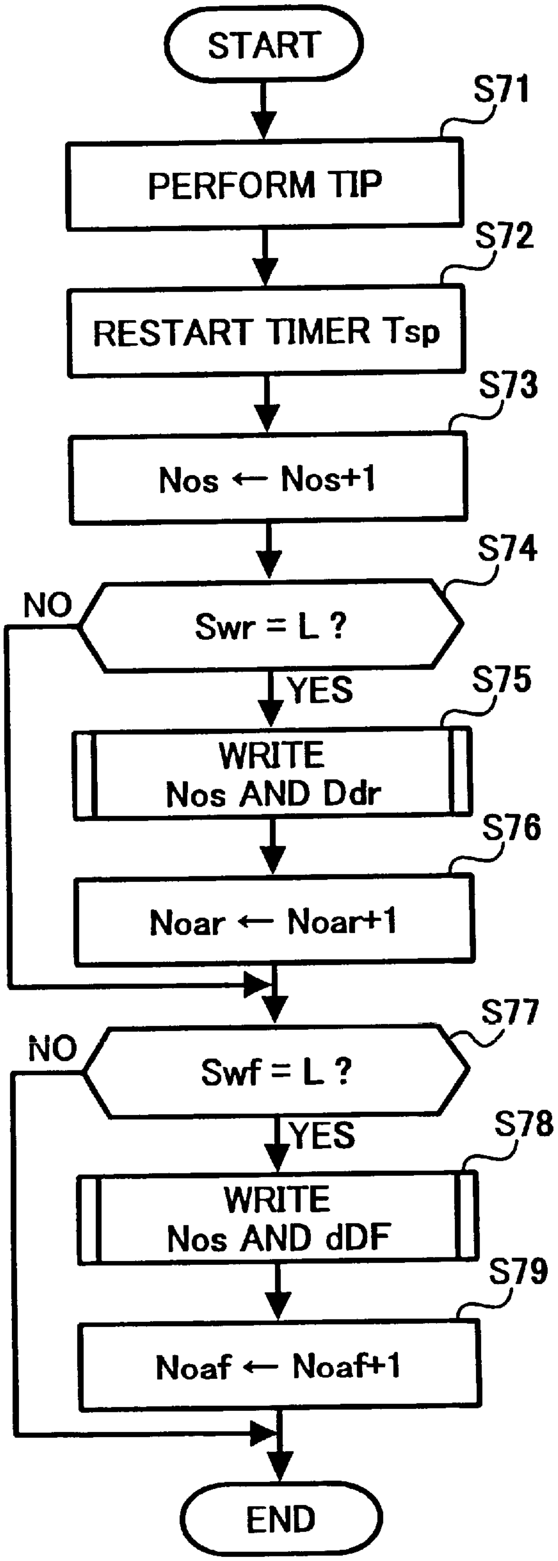
FIG. 13 is a flowchart for explaining a timer interruption during a performance of the pattern forming and measurement of FIG. 11.

The above-mentioned timer interruption process TIP is explained with reference to FIG. 13. The timer interruption process TIP is repeated each time the timer Tsp causes a time-out. In Step S71 of FIG. 13, the MPU 41 restarts the timer Tsp. Then, in Step S72, the MPU 41 provides the instruction signals Scr and Scf in a low (L) level to instruct the A/D converter **36*r* and 36*f*, respectively, to perform the A/D) conversion. In Step S73, the MPU 41** then increments the register Nos by 1 to increment the number of the sampling times by 1.

A value of Nos times Tsp represents a lapse of time since the leading edge of at least one of the start marks Msr and Msf is detected. From this lapse of time, the position presently under detection by the reflective optical sensors **20*r* or 20*f* can be calculated on the transfer belt 10** in the sheet travel direction S with the reference point of the start mark Msr or Msf.

In Step S74, the MPU 41 checks whether the mark edge signal Swr output from the window comparator **39*r* is low (L). By doing this, the MPU 41 can determine if the reflective optical sensor 20*r* is detecting the edge of the mark since the window comparator 39*r* outputs the mark edge signal Swr at a low (L) level when the detection signal Sdr has a voltage within the 2 to 3 volt range. If the mark edge signal Swr is determined to be low (L), the MPU 41 writes the number Nos of the sampling times stored in the register Nos and the detection data Ddr, representing the value of the detection signal Sdr detected by the reflective optical sensor 20*r*, into the memory area r at the address Noar, in Step S75. Then, the MPU 41 increments the address Noar by 1, which designates a writing address relative to the memory r, in Step S76. If the mark edge signal Swr is determined not to be low (L) and the check result of Step S74 is NO, that is, the detection signal Sdr is smaller than 2 volts or greater than 3 volts, the MPU 41 skips the process of writing the data into the memory r in Steps S75 and S76 and jumps to Step S77**. By this handling, an amount of data writing is reduced and the following processes can be made simple. The timer interruption process TIP then ends.

Likewise, the MPU 41 performs the processes of Steps S77–S79 for the detection of the marks of the front test pattern in a manner similar to that for the marks of the rear test pattern executed in Step S74–S76.

That is, in Step S77, the MPU 41 checks if the mark edge signal Swf output from the window comparator **39*f* is low (L). By doing this, the MPU 41 can determine if the reflective optical sensor 20*f* is detecting the edge of the mark since the window comparator 39*f* outputs the mark edge signal Swf at a low (L) level when the detection signal Sdf has a voltage within the 2 to 3 volt range. If the mark edge signal Swf is determined to be low (L), the MPU 41 writes the number Nos of the sampling times stored in the register Nos and the detection data Ddf, representing the value of the detection signal Sdf detected by the reflective optical sensor 20*f*, into the memory area f at the address Noaf, in Step S78. Then, the MPU 41 increments the address Noaf by 1, which designates a writing address relative to the memory f, in Step S79. If the mark edge signal Swf is determined not to be low (L) and the check result of Step S77 is NO, that is, the detection signal Sdf is smaller than 2 volts or greater than 3 volts, the MPU 41 skips the process of writing the data into the memory f in Steps S78 and S79**. Then, the timer interruption process TIP ends.

Figure 14:
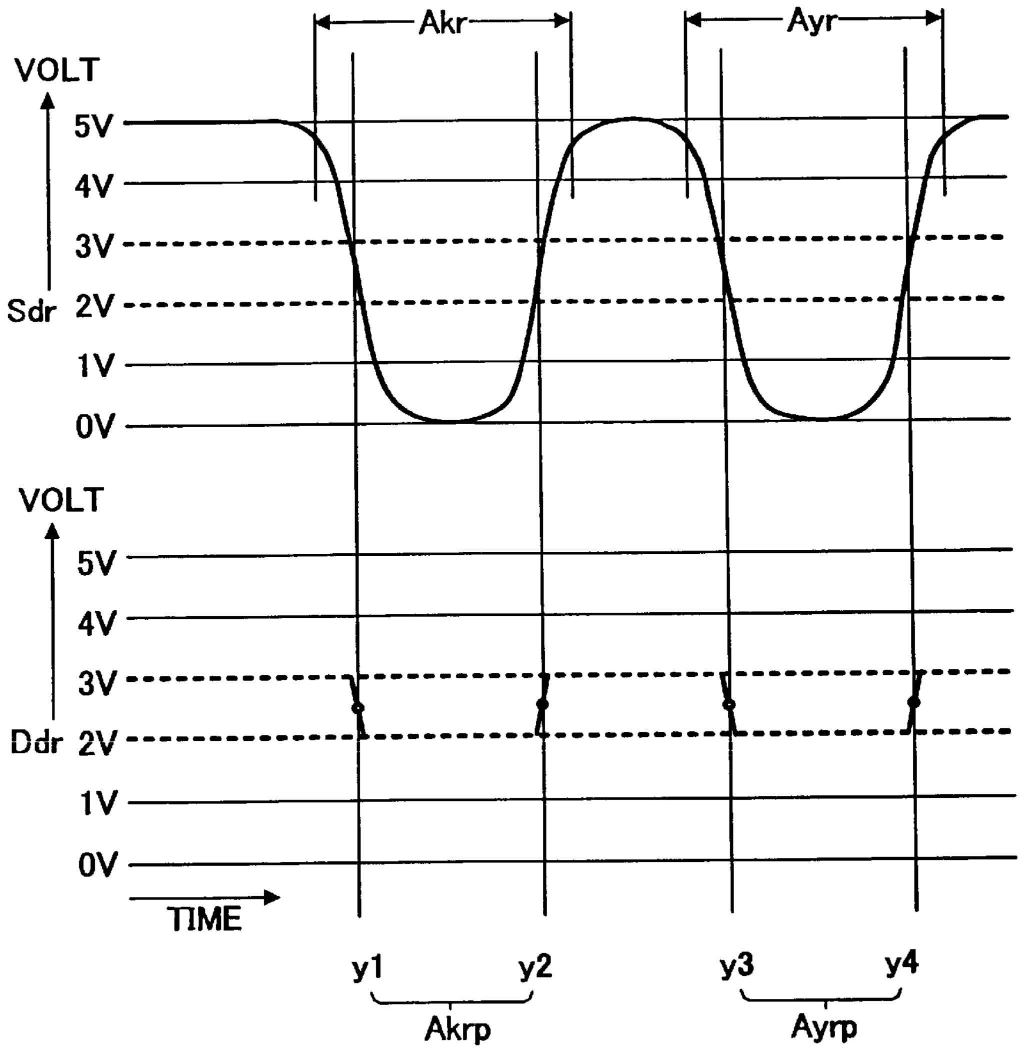
FIG. 14 is a time chart for explaining a relationship between the detection signal and a mark edge signal.

FIG. 14 demonstrates a relationship between the detection signal Sdr and the mark edge signal Ddr output by the A/D converter **36*r* with the instruction signal Scr given by the MPU 41. More specifically, the mark edge signal Ddr represents a portion of the detection signal Sdr, in particular, the portion with the voltage in the 2 to 3 voltage range. Here, the timer interruption process TIP is repeated in a period of the time Tsp. Therefore, the MPU 41 instructs the A/D converter 36*r* to convert the detection signal Sdr varying from high (H) to low (L), as shown in FIG. 14, into the mark edge data Ddr representing the detection signal limited within the 2 to 3 volt range when writing the mark edge data Ddr into the memory area r of the MPU 41. In a similar manner, the MPU 41 handles the writing of the mark edge signal Ddf. When writing the mark edge signals Ddr and Ddf into the memories r and f, respectively, the MPU 41 also writes the number Nos of sampling times into the memories r and f. The number Nos of sampling times indicates a position on the surface of the transfer belt 10 in the direction y measured from the basic point of the start mark detected. This is because the number Nos of sampling times is incremented by 1 in the period of time Tsp and because the transfer belt 10** is driven to move at a constant speed.

In addition, FIG. 14 demonstrates that the mark edge signal Ddr includes a first descending data segment having a center point y1, a first ascending data segment having a center point y2, a second descending data segment having a center point y3, and a second ascending data segment having a center point y4. A center between the center points y1 and y2 is calculated and is referred to as Akrp, for example, and a center point between the center points y3 and y4 is calculated and is referred to as Ayrp, for example. These calculations are performed by the process MCA in Step S59 of FIG. 11.

Figure 15A:
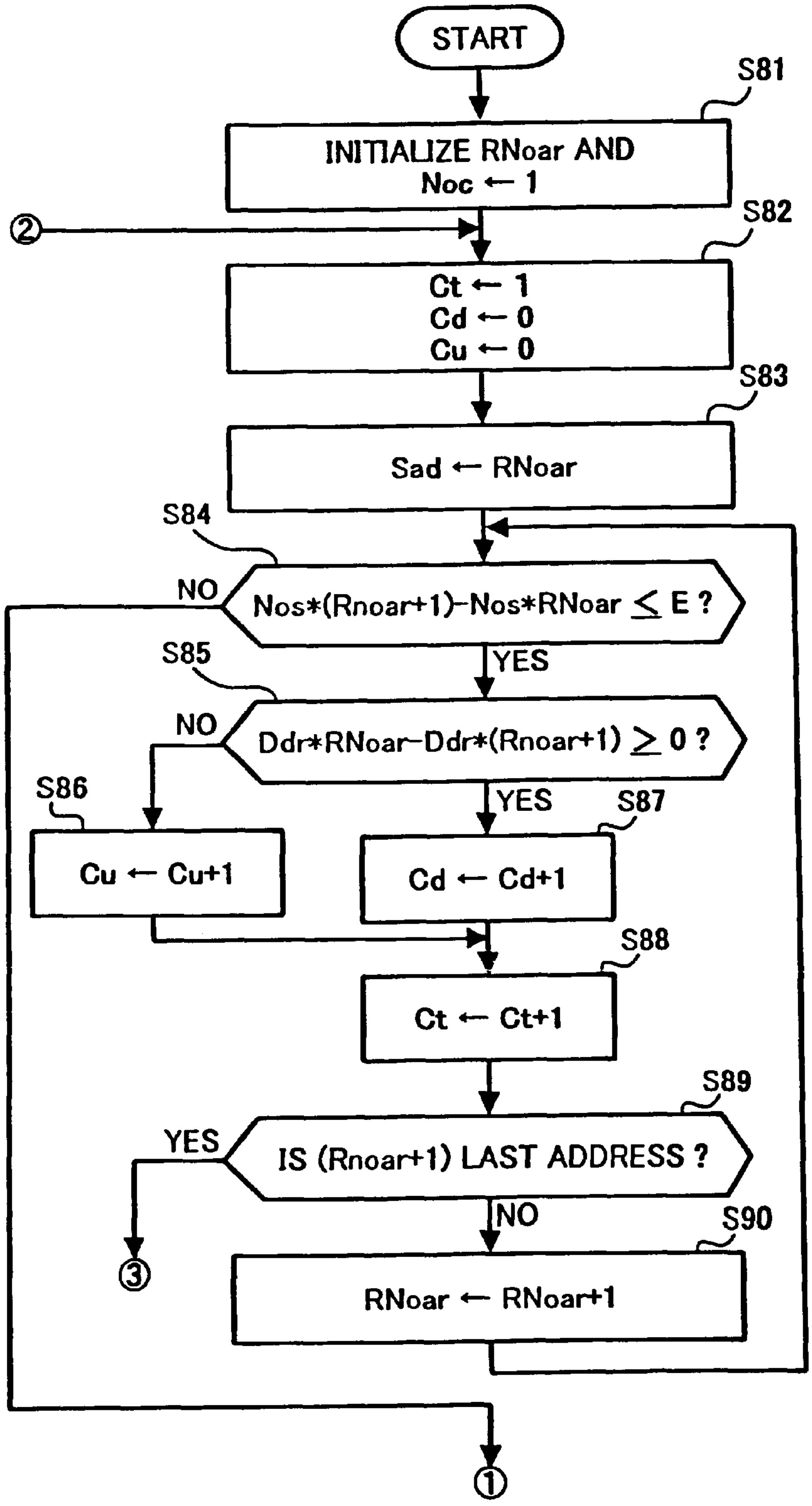
FIGS. 15A and 15B are flowcharts for explaining the color print adjustment included in the flowchart of FIGS. 9A and 9B.
Figure 15B:
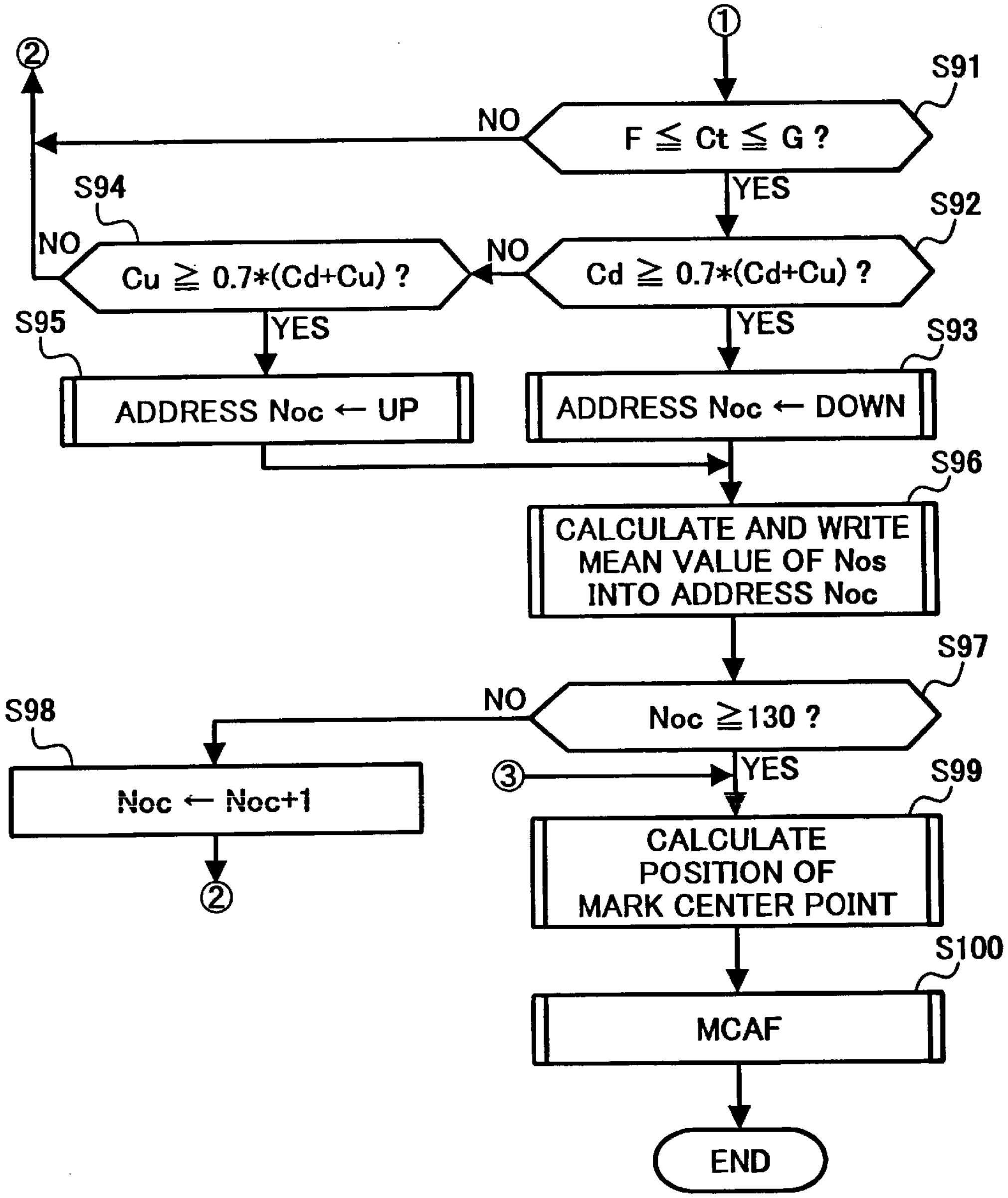

Referring to FIGS. 15A and 15B, an exemplary procedure of the mark center arithmetic process MCA is explained. The mark center arithmetic process MCA is shown in FIGS. 15A and 15B and includes a process MCAr for calculating center points of the marks of the rear test pattern and a process MCAf for calculating center points of the marks of the front test pattern. The MCAr includes the processes of Steps S81–S99, and the MCAf includes the processes of Step S100. The following discussion focuses on the process MCAr, as an example, for convenience sake since the process MCAf is configured to operate in a manner similar to the process MCAr with a difference in the front and rear positions.

In Step S81 of FIG. 15A, the MPU 41 clears an address RNoar at which the memory r in the FIFO memory of the MPU 41 is read, and initializes a register Noc for storing a number of a center point so that a number of a center point is set to 1, which represents the first edge. In Step S82, the MPU 41 further initializes a register Ct for storing a number of sampling times relative to a single edge, thereby setting data Ct to 1. The MPU 41 further initializes in Step S82 a register Cd for storing a number of descending times to set data Cd to 0 and a register Ca for storing a number of ascending times to set data Ca to 0. Then, in Step S83, the MPU 41 writes the address RNoar into a register Sad for storing a first address of edge area data. The above-mentioned processes of Steps S81–S83 are a preparatory process for processing data of the first edge area.

In Step S84, the MPU 41 checks if the data belong to a single mark. In this step, the MPU 41 reads data at the address RNoar of the memory r. The read data includes a first data value of Nos multiplied by RNoar and a second data value of Ddr multiplied by RNoar. As described above, the number Nos of the sampling times indicates a position on the surface of the transfer belt 10 in the direction y from the basic point of the start mark detected. Further, the MPU 41 reads data in the memory r by incrementing the address RNoar by 1. The read data includes a third data value of Nos multiplied by RNoar incremented by 1 and a fourth data value of Ddr multiplied by RNoar incremented by 1. Then, the MPU 41 calculates a difference between the first and third data values and determines if the difference is equal to or smaller than a predetermined value E. Since the above-mentioned first and third data values represent the positions in the direction y, the difference between the first and third data values represents a difference between the two positions in the direction y. The predetermined value E is set to a half the width W, for example. As described above, the width W represents a width of the marks in the direction y and is set to 1 mm, for example. Therefore, the value E is 0.5 mm, for example. In this way, the MPU 1 determines if the data belong to a single mark.

If the data is determined to belong to a single mark and the determination result of Step S84 is YES, the MPU 41 determines if the data represents a descending or ascending trend, in Step S85. In this process, the MPU 41 calculates a difference between the second and fourth data values and determines if the difference is equal to or greater than 0. If the difference is determined to not be equal to or greater than 0 and the determination result of Step S85 is NO, the MPU 41 determines that the data represents an ascending trend and increments the register Ca by 1, in Step S86. If the difference is determined to be equal to or greater than 0 and the determination result of Step S85 is YES, the MPU 41 determines that the data represents a descending trend and increments the register Cd by 1, in Step S87. Then, in Step S88, the MPU 41 increments the data Ct in the register Ct representing the number of sampling times in a single edge by 1. In Step S89, the MPU 41 determines if the address RNoar specifies the last address of the memory r. If the address RNoar is determined as specifying the last address of the memory r and the determination result of Step S89 is YES, the process jumps to Step S99. If the address RNoar is determined not to specify the last address of the memory r and the determination result of Step S89 is NO, the MPU 41 increments the RNoar by 1 in Step S90 and returns to Step S84 to repeat the same processes.

When the data of the position in the direction y is changed to the one in the following edge, the difference of the first and third data values respectively stored in the two adjacent addresses such as RNoar and RNoar+1, for example, is greater than the predetermined value E and therefore the determination result of Step S84 is NO. In this case, the MPU 41 proceeds to Step S91 of FIG. 15B. By the procedure carried out so far, the MPU 41 has made a determination with respect to the trends of descending and ascending on each sampling data in an area of a leading or trailing edge of a mark. Therefore, in Step S91, the MPU 41 determines if the data Ct, representing the number of the sampling times in a single edge and that is stored in the register Ct, is within a predetermined data range corresponding to a range of an edge limited by the 2 to 3 volt range. The predetermined data range includes a lower limit value F and an upper limit value G. The lower limit value F represents a lower limit number of sampling times to write sampling data of the digital data Ddr into the memory r when the detection signal Sdr is within the 2 to 3 volt range. Likewise, the upper limit value G represents an upper limit number of sampling times to write sampling data of the digital data Ddr into the memory r when the detection signal Sdr is within the 2 to 3 volt range.

If the data Ct is determined to be equal to the lower limit F, or greater than the lower limit F and smaller than the upper limit G, or equal to the upper limit G, as the determination result of Step S91, it should be understood that a data error check on one edge of a mark based on the data properly read and stored is successfully performed and proves that the data are appropriate. If the data Ct is determined in Step S91 as not equal to the lower limit F, or greater than the lower limit F and smaller than the upper limit G, or equal to the upper limit G, the process returns to Step S82 to perform the following mark.

Then, the MPU 41 determines if the obtained detection data relative to a specific mark as a whole has a descending or ascending trend, in Steps S92 and S94. More specifically, in Step S92, the MPU 41 determines whether the data Cd stored in the register Cd, storing a number of descending times, is equal to or greater than 70%, for example, of a value summing the data of Cd and Ca. If the data Cd is determined to be equal to or greater than 70%, for example, of a value summing the data of Cd and Ca and the determination result of Step S92 is YES, the MPU 41 proceeds to Step S93 and writes information Down indicating the descending trend into the memory r at an address specifying an edge number using a value of the data Noc stored in the register Noc at the address Noc, storing a number of a center point. If the data Cd is determined not to be equal to or greater than 70%, for example, of a value summing the data of Cd and Ca and the determination result of Step S92 is NO, the MPU 41 proceeds to Step S94 and further determines if the data Ca is equal to or greater than 70%, for example, of a value summing the data of Cd and Ca. If the data Ca is determined as equal to or greater than 70%, for example, of a value summing the data of Cd and Ca and the determination result of Step S94 is YES, the MPU 41 proceeds to Step S95 and writes information Up indicating the ascending trend into the memory r at an address specifying an edge number using a value of the data Noc stored in the register Noc at the address Noc. If the data Ca is determined as not equal to or greater than 70%, for example, of a value summing the data of Cd and Ca and the determination result of Step S94 is NO, the process returns to Step S82 to perform the following mark.

Then, in Step S96, the MPU 41 calculates a mean value of the data representing the positions in the direction y within the area of the present edge, that is, a position of a center point, such as the center points y1–y4 shown in FIG. 14, in the present edge area. This calculation is performed on the data Nos of every sampling time from the time of the Sad to the time of the RNoar minus 1. Further, in Step S96, the MPU 41 writes the calculated mean value into the memory r at an address specifying an edge number using a value of the data Noc stored in the register Noc at the address Noc.

Then, in Step S97, the MPU 41 checks whether the address of the edge number with the value of the data Noc is equal to or greater than 130. This is to check whether the center point calculation has been completed on every leading and trailing edge of the start mark Msr and the marks included in the eight rear mark sets Mtr1–Mtr8. If the edge number address with the value of the data Noc is determined to be equal to or greater than 130 and the determination result of Step S97 is YES, or if the reading of the data stored in the memory r has been completed, the MPU 41 proceeds to Step S99 and calculates positions of mark center points based on the positions of the edge center points calculated in Step S96. If the edge number address with the value of the data Noc is determined as not equal to or greater than 130 and the determination result of Step S97 is NO, the MPU 41 proceeds to Step S98 to increment the register Noc by 1 so that the number Noc of the center point is incremented by 1. Then, the MPU 41 returns to Step S82 to perform the processes for the following mark.

In summary, the MPU 41 reads the data, including the descending and ascending data and the data for the positions of the edge center points, at the addresses with the edge numbers. Then, the MPU 41 determines whether the difference of the positions between the center points of the descending edge and the immediately following ascending edge is within the predetermined range corresponding to the width W in the direction y. If the difference is determined as out of the predetermined range, the data examined are deleted. If the difference is determined as within the predetermined range, MPU 41 regards a mean value of the data examined as a position of a center point of the mark examined and writes the position in the memory at an address specified by the number of the present mark counted from the first mark. If the processes of test pattern image forming, mark detection, and detection data processing are appropriately performed, a total of 65 positions of mark center points with respect to the rear test pattern, including one start mark Msr and 64 marks included in the eight rear mark sets Mtr1–Mtr8, are obtained and are stored in the memory.

Then, in Step S100, the MPU 41 executes the process MCAf to calculate positions of center points for the marks detected from the front test pattern in a manner similar to those for the marks of the rear test pattern described above. As a result of the process MCAf, when the processes of the test pattern image forming, the mark detection, and the detection data processing are appropriately performed, a total of 65 positions of mark center points with respect to the front test pattern, including one start mark Msf and 64 marks included in the eight front mark sets Mtf1–Mtf8, are obtained and are stored in the memory.

In this way, the MPU 41 executes the mark center arithmetic process MCA and obtains the positions of the center points for the marks detected from the front and rear test patterns through the color print adjustment (CPA).

In FIG. 11, after completing a calculation of the positions of the mark center points in Step S59, the MPU 41 proceeds to Step S60 to perform the set pattern confirmation process SPC. In the process SPC, the MPU 41 determines if the positions of the mark center points written into the memory match with the center points of the marks indicated in FIG. 6. The positions of the mark center points written into the memory determined not to match with the center points of the marks of FIG. 6 are deleted in a unit of a data set including eight position data. The positions of the mark center points written into the memory determined to match with the center points of the marks of FIG. 6 are left effective in a unit of a data set. When every position of the mark center points written into the memory is determined to match with the center points of the marks of FIG. 6, there are eight data sets for the rear side and eight data set for the front side.

Further, in Step S60, the MPU 41 changes the data of the center point position for the first mark included in each rear mark set on and after the second rear mark set to the data for the first mark of the first rear mark set. Also, the MPU 41 changes the data of the center point positions for the second to eighth marks included in each rear mark set with the difference used for the first mark. In other words, the data of the center point positions for each rear mark set on and after the second mark set are changed to the values shifted in the direction y so that the position of the first mark of each rear mark set meets the position of the first mark of the first rear mark set. Likewise, in the front side, the data of the center point position for the first mark included in each front mark set on and after the second front mark set are changed.

Figure 16:
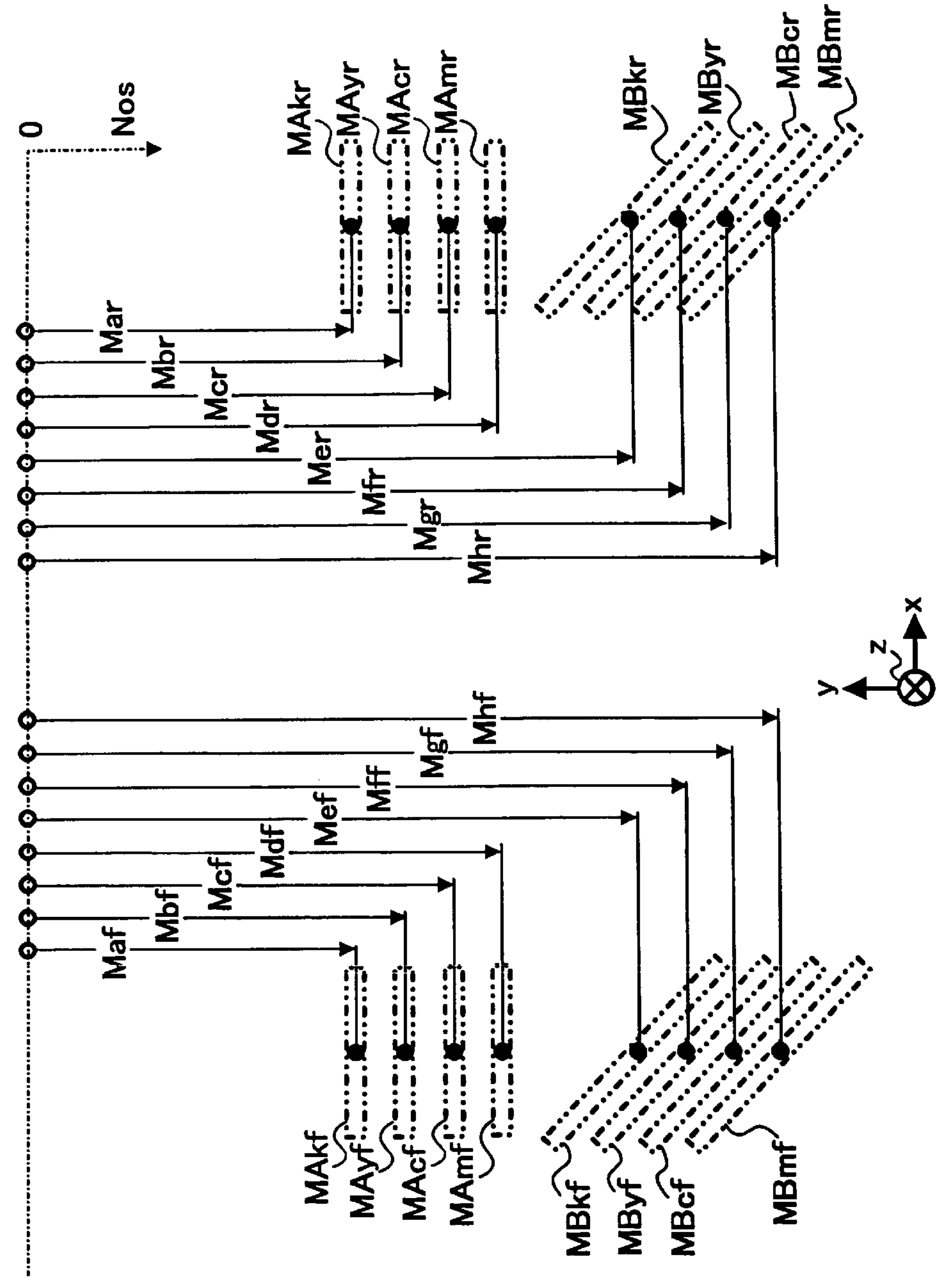
FIG. 16 is an illustration for explaining a relationship between center point positions of marks and imaginary center point positions.

Then, the MPU 41 executes the mean pattern arithmetic process MPA in Step S61. The process MPA is explained with reference to FIG. 16. The MPU 41 calculates the data of the center point positions for the marks of the eight rear mark sets and also for the eight front mark sets to obtain mean values Mar–Mhr and Maf–Mhf. These mean values are distributed as imaginary points, as illustrated in FIG. 16, and represent the positions of the center points for the following respective mean position marks: MAkr representing orthogonal rear Bk marks, MAyr representing orthogonal rear Y marks, MAcr representing orthogonal rear C marks, MAmr representing orthogonal rear M marks, MBkr representing slant rear Bk marks, MByr representing slant rear Y marks, MBcr representing slant rear C marks, MBmr representing slant rear M marks, MAkf representing orthogonal rear Bk marks, MAyf representing orthogonal front Y marks, MAcf representing orthogonal front C marks, MAmf representing orthogonal front M marks, MBkf representing slant front Bk marks, MByf representing slant front Y marks, MBcf representing slant front C marks, and MBmf representing slant front M marks.

In this way, the MPU 41 executes pattern forming and measurement (PFM) in Step S41 of FIG. 10B.

Figure 17:
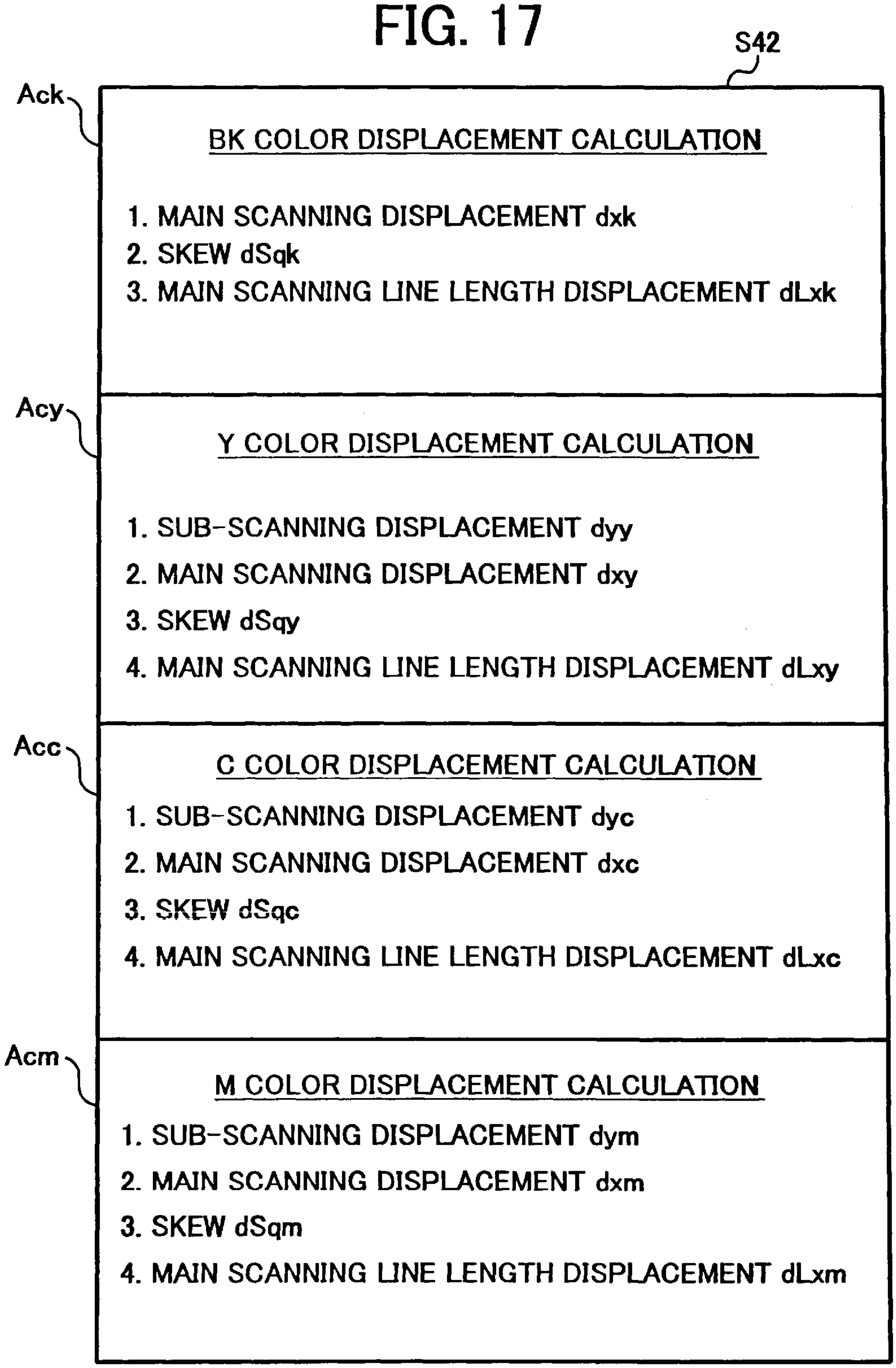
FIGS. 17 and 18 are illustrations for explaining contents of a displacement calculation process and a displacement adjustment process included in the flowchart of FIG. 10B.

Next, the displacement calculation process DAC in Step S42 of FIGS. 10B is explained with reference to FIG. 17. As an example, a calculation Acy for calculating an amount of image displacement for the color Y is explained. A sub-scanning displacement amount dyy is defined as a difference between one value of a difference between the center point positions of the orthogonal rear Bk mark MAkr and the orthogonal rear Y mark MAyr and another value of the pitch d shown in FIG. 6. That is, the sub-scanning displacement amount dyy is expressed as:

$$dyy=(Mbr-Mar)-d.$$

A main scanning displacement amount dxy is defined as a mean value of two displacement amounts dxyr and dxyf. The displacement amount dxyr is a difference between one value of a difference between the center point positions of the orthogonal rear Y mark MAyr and the slant rear Y mark MByr and another value of four times the pitch d, as shown in FIG. 6. That is, the displacement amount dxyr is expressed as:

$$dxyr=(Mfr-Mbr)-4d.$$

The displacement amount dxyf is a difference between one value of a difference between the center point positions of the orthogonal front Y mark MAyf and the slant rear Y mark MByf and another value of four times the pitch d, as shown in FIG. 6. That is, the displacement amount dxyr is expressed as:

$$dxyr=(Mff-Mbf)-4d.$$

The mean value of the displacement amounts dxyr and dxyf is as follows:

$$dxy=(dxyr+dxyf)/2=(Mfr-Mbr+Mff-Mbf-8d)/2.$$

A skew dSqy is defined as a value of a difference between the center point positions of the orthogonal rear Y mark MAyr and the orthogonal front Y mark MAyf. Therefore, the skew dsqy is expressed as:

$$dSqy=(Mbf-Mbr).$$

A main scanning line length dLxy is defined as a value of a difference between the center point positions of the slant rear Y mark MByr and the slant front Y mark MByf with subtraction by the amount of skew dSqy. That is, the main scanning line length dLxy is expressed as:

$$dLxy=(Mff-Mfr)-dSqy=(Mff-Mfr)-(Mbf-Mbr).$$

Calculation Acc and Acm for calculating amounts of image displacement for the colors C and M are performed in a manner similar to the above-described calculation Acy. A calculation Ack is also performed in a similar manner, except for the sub-scanning displacement dyk. That is, in this example, the calculation Ack does not include the calculation of the sub-scanning displacement dyk since the Bk color is used as a reference color for the color adjustment in the sub-scanning direction y.

Figure 18:
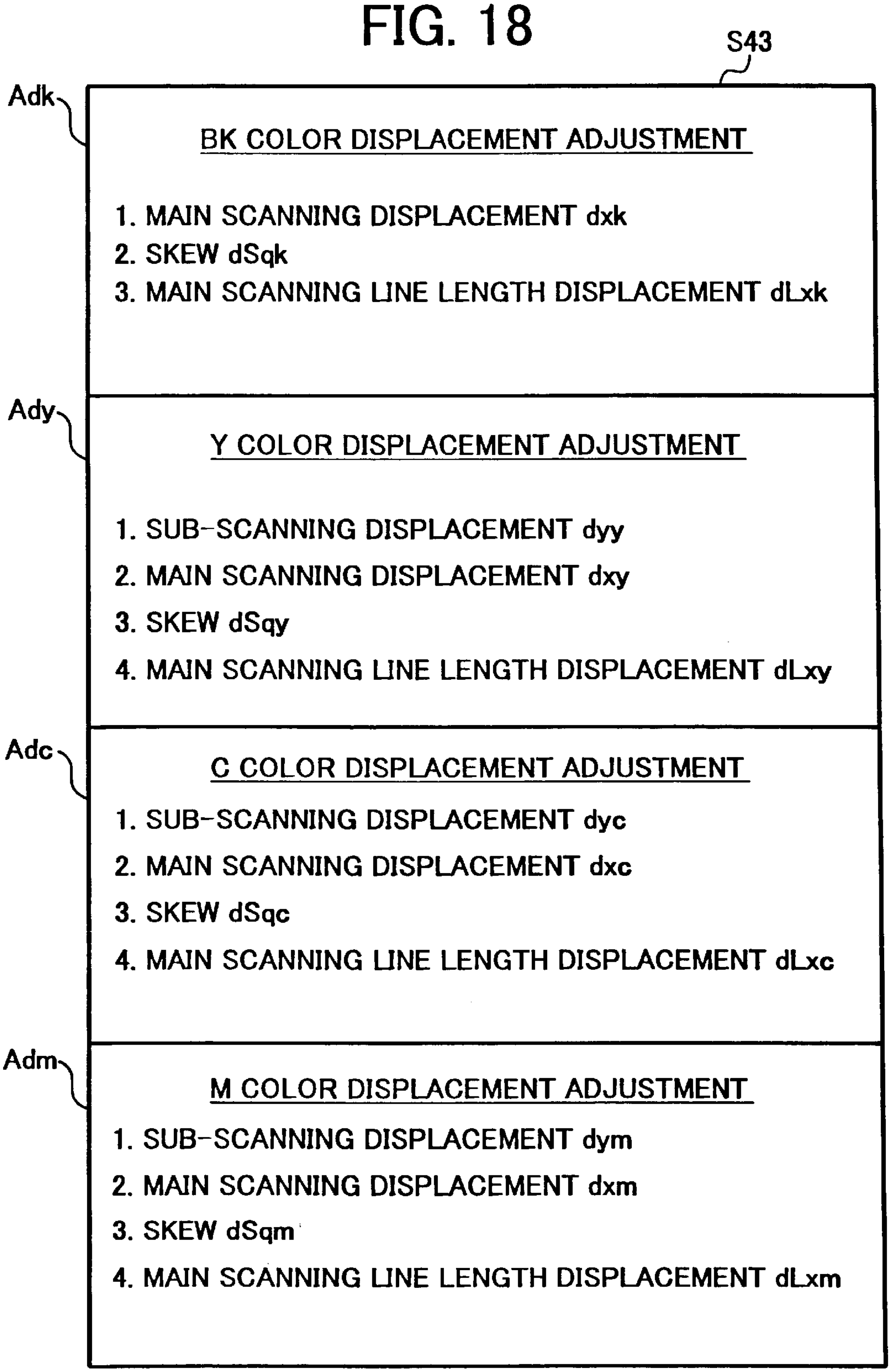

Next, the displacement adjustment process DAD in Step S43 of FIGS. 10B is explained with reference to FIG. 18. As an example, a displacement adjustment Ady for adjusting the image displacement of the color Y is explained.

To adjust the sub-scanning displacement dyy, the process for exposing an image for the Y color is started with a delay of the calculated value of the sub-scanning displacement dyy.

The main scanning displacement dxy can be adjusted in the following manner. The transmission of the first image data of the line, relative to a line synchronous signal representing the leading part of the line, to an exposing laser modulator of the optical writing unit 5 in the process for exposing an image for the Y color is started with a delay of the calculated value of the sub-scanning displacement dxy.

The skew dSqy can be adjusted as follows. The optical writing unit 5 includes a mirror (not shown) disposed at a position facing the photosensitive drum 6*b* to reflect a laser beam modulated with Y image data to the surface of the photosensitive drum 6*a*. This mirror is extended in the direction x, and has a rear side rotatably held with a fulcrum and a front side held with a block slidable in the direction y. The block is moved back and forth in the direction y with a y-driving mechanism including a pulse motor, screws, etc. In the adjustment of the skew dsqy, the pulse motor of the y-driving mechanism is driven to move the block in the direction y for a distance of the calculated value of the skew dSqy.

The main scanning line length displacement dLxy can be adjusted by setting a frequency of pixel synchronous clocks assigning image data to bits on a line in a unit of pixel to a value obtained with a formula:

$$Fr*Ls/(Ls+dLxy),$$

wherein Fr represents a reference frequency and Ls represents a reference line length.

Adjustments Adc and Adm for adjusting the image displacements of the colors C and M are performed in a manner similar to the above-described adjustment Ady. A adjustment Adk is also performed in a similar manner, except for the sub-scanning displacement dyk. That is, in this example, the adjustment Ack does not include the adjustment of the sub-scanning displacement dyk since the Bk color is used as a reference color for the color adjustment in the sub-scanning direction y.

The disclosure of this patent specification may be conveniently implemented using a conventional general purpose digital computer programmed according to the teaching of the present specification, as will be apparent to those skilled in the computer art. Appropriate software coding can readily be prepared by skilled programmers based on the teachings of the present disclosure, as will be apparent to those skilled in the software art. The present disclosure may also be implemented by the preparation of application specific integrated circuits or by interconnecting an appropriate network of conventional component circuits, as will be readily apparent to those skilled in the art.

Numerous additional modifications and variations are possible in light of the above teachings. It is therefore to be understood that within the scope of the appended claims, the disclosure of this patent specification may be practiced otherwise than as specifically described herein.

This document is based on Japanese patent application, No. JPAP2001-002482 filed on Jan. 10, 2001, in the Japanese Patent Office, the entire contents of which are hereby incorporated herein by reference.

What is claimed is:

1. A method of color image forming, comprising:

providing a plurality of detachable image forming mechanisms for forming color images, each said image forming mechanism individually using a color toner different from each other, and an image carrying member for carrying said color images sequentially overlaid into a single color image;

detecting with a detecting mechanism an individual exchange of one of said plurality of detachable image forming mechanisms; and performing an adjustment for eliminating displacements of color images formed by said plurality of detachable image forming mechanism, in accordance with a detection of said individual exchange of one of said plurality of detachable image forming mechanisms detected in said detecting.

2. A method as defined in claim 1, wherein each of said plurality of detachable image forming mechanisms includes a photosensitive member.

3. A method as defined in claim 1, wherein each of said plurality of detachable image forming mechanisms includes a developing mechanism containing a different developing agent.

4. A method of color image forming, comprising:

providing a plurality of detachable image forming mechanisms for forming color images, each said image forming mechanism individually using a color toner different from each other, and an image carrying member for carrying said color images sequentially overlaid into a single color image;

detecting an individual exchange of one of said plurality of detachable image forming mechanisms;

performing an adjustment for eliminating displacements of color images formed by said plurality of detachable image forming mechanism, in accordance with a detection of said individual exchange of one of said plurality of detachable image forming mechanisms detected in said detecting; and executing a process control for controlling image forming parameters prior to said adjustment performing.

5. An image forming apparatus, comprising:

an optical writing mechanism configured to generate a writing beam modulated according to image data;

a plurality of detachable image forming mechanisms, each including a photosensitive member and configured to form a color image with a different color toner in accordance with said writing beam;

an image carrying member configured to carry color images formed by said plurality of detachable image forming mechanisms, where said color images are sequentially overlaid into a single color image;

an exchange detecting mechanism configured to detect an individual exchange of one of said plurality of detachable image forming mechanisms;

a test pattern reading mechanism configured to read a predetermined test pattern formed by said plurality of detachable image forming mechanisms on said image carrying member; and a controlling mechanism configured to instruct said plurality of detachable image forming mechanisms to form said predetermined test pattern on said image carrying member when said exchange detecting mechanism detects an individual exchange of one of said plurality of detachable image forming mechanisms, and to perform a color image position adjustment based on readings of said predetermined test pattern by said test pattern reading mechanism.

6. An image forming apparatus as defined in claim 5, wherein said exchange detecting mechanism includes a detecting member and an actuator is associated with each of said plurality of detachable image forming mechanisms, said detecting member detecting said actuator, and said actuator being moved to a position detectable by said detecting member after a corresponding one of said plurality of detachable image forming mechanisms is driven.

7. An image forming apparatus as defined in claim 5, wherein each of said plurality of detachable image forming mechanisms uses one color toner selected from magenta, cyan, yellow, and black, and each of said plurality of detachable image forming mechanisms employs a different toner.

8. An image forming apparatus as defined in claim 7, wherein said predetermined test pattern includes patterns of said magenta, cyan, yellow, and black color toners sequentially formed with a distance between two immediately adjacent patterns.

9. An image forming apparatus as defined in claim 5, wherein said color image position adjustment adjusts said optical writing mechanism to justify positions of said color images formed on said image carrying member by said plurality of detachable image forming mechanisms.

10. An image forming apparatus, comprising:

optically writing means for generating a writing beam modulated according to image data;

a plurality of image forming means for forming a plurality of color images with different color toners in accordance with said writing beam, each of said plurality of image forming means being detachable from said apparatus;

image carrying means for carrying said color images formed by said plurality of image forming means, said color images sequentially overlaid into a single color image;

detecting means for detecting an event in which at least one of said plurality of image forming means is exchanged;

reading means for reading a predetermined test pattern formed by said plurality of image forming means on said image carrying means; and controlling means for instructing said plurality of image forming means to form said predetermined test pattern on said image carrying means when said detecting means detects said event in which at least one of said plurality of image forming means is exchanged, and to perform a color image position adjustment based on readings of said predetermined test pattern by said reading means.

11. An image forming apparatus as defined in claim 10, wherein said detecting means includes a detecting means and an actuating means is associated with each of said plurality of image forming means, said detecting means for detecting said actuating means, and said actuating means being moved to a position detectable by said detecting means after a corresponding one of said plurality of image forming means is driven.

12. An image forming apparatus as defined in claim 10, wherein each of said plurality of image forming means uses one color toner of magenta, cyan, yellow, and black color toners, and each said image forming means employs a different toner.

13. An image forming apparatus as defined in claim 12, wherein said predetermined test pattern includes patterns of said magenta, cyan, yellow, and black color toners sequentially formed with a distance between two immediately adjacent patterns.

14. An image forming apparatus as defined in claim 10, wherein said color image position adjustment adjusts said optical writing means to justify positions of said color images formed on said image carrying means by said plurality of image forming means.

15. A method of image forming, comprising:

arranging an optical writing mechanism to generate a writing beam in accordance with image data;

providing a plurality of detachable image forming mechanisms detachably installed to apparatus, said plurality of image forming mechanisms configured to form color images according to said writing beam with different color toners in a manner overlaying said color images to form a single composite color image on an image carrying member;

detecting with a detecting mechanism an event in which at least one of said plurality of detachable image forming mechanisms is exchanged;

instructing said plurality of detachable image forming mechanisms to form a predetermined test pattern on said image carrying member when said detecting mechanism detects said event in which at least one of said plurality of detachable image forming mechanisms is exchanged;

reading said predetermined test pattern formed by said plurality of detachable image forming mechanisms on said image carrying member; and performing a color image position adjustment based on said readings of said predetermined test pattern in said reading.

16. A method as defined in claim 15, wherein said detecting mechanism used in said detecting includes a detecting member and includes an actuator associated with each of said plurality of detachable image forming mechanisms, said detecting member detecting said actuator, and said actuator being moved to a position detectable by said detecting member after a corresponding one of said plurality of detachable image forming mechanisms is driven.

17. A method as defined in claim 15, wherein each of said plurality of detachable image forming mechanisms uses one color toner of magenta, cyan, yellow, and black color toners, and each of said image forming mechanisms employs a different color toner.

18. A method of image forming as defined in claim 17, wherein said predetermined test pattern includes patterns of said magenta, cyan, yellow, and black color toners sequentially formed with a slight distance between two immediately adjacent patterns.

19. A method of image forming as defined in claim 15, wherein said color image position adjustment adjusts said optical writing mechanism to justify positions of said color images formed on said image carrying member by said plurality of detachable image forming mechanisms.

* * * * *